United States Patent [19]
Tanaka et al.

[11] Patent Number: 5,733,644
[45] Date of Patent: Mar. 31, 1998

[54] CURABLE COMPOSITION AND METHOD FOR PREPARING THE SAME

[75] Inventors: Seiichiro Tanaka; Hanako Kato; Takeshi Sawai; Nobuyuki Matsuzoe; Kenji Oba; Yukio Kajiwara; Hozumi Endo, all of Kitakyushu, Japan

[73] Assignee: Mitsubishi Chemical Corporation, Tokyo, Japan

[21] Appl. No.: 722,140

[22] PCT Filed: Apr. 15, 1995

[86] PCT No.: PCT/JP95/00746

§ 371 Date: Jan. 7, 1997

§ 102(e) Date: Jan. 7, 1997

[87] PCT Pub. No.: WO95/28445

PCT Pub. Date: Oct. 26, 1995

[30] Foreign Application Priority Data

| Apr. 15, 1994 | [JP] | Japan | 6-077644 |
| Apr. 18, 1994 | [JP] | Japan | 6-078599 |
| May 10, 1994 | [JP] | Japan | 6-096316 |
| Aug. 18, 1994 | [JP] | Japan | 6-194205 |
| Sep. 20, 1994 | [JP] | Japan | 6-224907 |
| Dec. 1, 1994 | [JP] | Japan | 6-298600 |
| Dec. 1, 1994 | [JP] | Japan | 6-298601 |

[51] Int. Cl.$^6$ ........................ B32B 7/02
[52] U.S. Cl. ............... 428/215; 528/27; 525/342; 525/446; 525/476
[58] Field of Search ............... 528/27; 525/342, 525/446, 476; 428/215

[56] References Cited

U.S. PATENT DOCUMENTS

| 3,429,845 | 2/1969 | Bechtold et al. |
| 3,917,648 | 11/1975 | McLeod. |
| 4,028,300 | 6/1977 | Wake et al. |
| 4,374,933 | 2/1983 | Scholze et al. .................. 528/10 |
| 4,714,738 | 12/1987 | Chang et al. .................. 525/342 |
| 4,732,929 | 3/1988 | Chang et al. |

FOREIGN PATENT DOCUMENTS

| 0 287 877 A2 | 10/1988 | European Pat. Off. |
| 0 401 388 A1 | 12/1990 | European Pat. Off. |
| 0 611 812 A2 | 8/1994 | European Pat. Off. |

OTHER PUBLICATIONS

Advanced Materials, vol. 5, No. 6, Jun. 1, 1993, Bruce NOVAK, "Hybrid Nanocomposite Materials—Between Inorganic Glasses and Organic Polymers", pp. 422–433.

*Primary Examiner*—Melvyn I. Marquis
*Attorney, Agent, or Firm*—Oblon, Spivak, McClelland, Maier & Neustadt, P.C.

[57] ABSTRACT

A curable composition comprising an aged mixture of tetramethoxysilane with water added in excess of the theoretical amount sufficient for the hydrolysis and condensation of 100% of the silane and a reactive organic compound having at least two functional groups capable of condensing with the product of hydrolysis and condensation of the silane in the above mixture.

18 Claims, 9 Drawing Sheets

CURABLE COMPOSITION AND METHOD FOR PREPARING THE SAME

TECHNICAL FIELD

The present invention relates to a curable composition and a method for preparing the same. More particularly, the present invention relates to a curable composition and a method for preparing the same, which can be applied to naturally occurring or synthetic silica, iron, stainless steel, aluminum, copper, and other metals, plastics, glass, wood material, cement, concrete and other products, or powders of aluminum hydroxide, calcium silicate, calcium carbonate, magnetic powder and metallic powder, or wire materials such as glass fiber and metallic wires, to form a coating film excellent in scratch resistance, transparency, heat resistance, weather resistance, adhesion, acid resistance, blocking resistance, stain resistance, water resistance, thermal shock resistance, sliding resistance, tipping resistance and other properties, or to obtain modified powders, particles or wires, and which can be satisfactorily used for impregnating various naturally occurring or synthetic materials, or which can be used for bonding or for casting, compression molding and other uses.

BACKGROUND ART

An organic material including Japanese lacquer as a typical example provides an excellent beautiful appearance, but is soft and is easily damaged, and is inconvenient for forming a coating film since it requires wet-on-wet coating.

Accordingly, in recent years, it has been tried to incorporate an inorganic element into an organic material in order to provide high hardness characteristic to an inorganic material. These examples include a fluororesin obtained by polymerizing a fluorine-containing monomer (e.g. "Lumiflon" trade mark of Asahi Glass Company) or a silicon resin obtained by polymerizing a silicon-containing monomer (e.g. "Zemlac" trade mark of Kanegafuchi Kagaku Kogyo K. K.).

However, fluororesin is still soft and easily damaged, and has another disadvantage of easily absorbing an oil component and being easily stained. With regard to the silicon resin, it is possible to raise its hardness, but it is difficult to increase a silicon content to more than 10 wt % (in terms of $SiO_2$) and a product having a silicon content of at least 10 wt % is not actually present.

Thus, heretofore, an inorganic element has been introduced into an organic compound in the production of a molecule, but the amount of an inorganic element to be introduced into an organic monomer is limited. That is, the number of inorganic elements which can be introduced into an organic compound is limited.

On the other hand, there have been developed methods for protecting workpieces or structures with inorganic materials from natural environments, maintaining their beautiful appearances and prolonging their lives. Examples of these techniques include a method for coating the surface of a metal with an "amorphous material having a polysiloxane bond comprising silicon and oxygen as the main components", and a Japanese "cloisonné" ware may be illustrated as an example. The Japanese "cloisonné" ware is obtained by coating a starting powder comprising silica sand as the main component on the surface of a metal such as copper, firing and melting the inorganic material to form an amorphous film.

The above "amorphous material having a polysiloxane bond comprising silicon and oxygen as the main components" has advantages such as maintenance of beautiful appearance, excellent weather resistance, scratch resistance and acid resistance, but also has a disadvantage that it is brittle (brittle and easily breakable).

Accordingly, the present inventors have employed such an amorphous polysiloxane bond as in the above-mentioned "cloisonné" ware in the introduction of silicon into an organic compound, and have overcome the above-mentioned disadvantages of the above resin and the "cloisonné" ware. Further, they have studied to provide an organic coating film improved in flexibility, and have proposed to provide a novel coating composition using tetramethoxysilane, which is improved in hardness, solvent resistance, chemical resistance, stain resistance, scratch resistance and other properties (see Japanese Patent Applications No. 204229/1993, No. 80764/1993, No. 101116/1993, No. 296772/1993 and No. 296773/1993).

However, coating films obtained by these coating solutions are excellent in hardness, solvent resistance and chemical resistance, but they are thin and poor in flexibility. If the thickness is made large, cracking is caused during working, and adhesion to a metallic material is poor and should be improved in this respect. Also, when these coating solutions are used for coating inorganic powders, fluidity is improved, but is poor in adhesion to an organic matrix such as artificial marble and also poor in strength, water resistance and impact resistance.

On the other hand, inorganic powders such as calcium carbonate, carbon black, boron, titanium oxide and iron oxide have been blended with plastics, paint, ink, rubber or the like, thereby improving in the gain of weight, heat resistance, insulating property, anti-blocking property, printability or other properties. Since the surface of these inorganic powders is generally hydrophilic, a surface modifier such as stearic acid, tallow ester, a surface active agent, a resin acid or a titanate type coupling agent is used for improving its dispersibility in a high molecular material. However, since the surface of an inorganic powder is inert, it is difficult to conduct the surface treatment with a silane type coupling agent having a satisfactory affinity with various high molecular materials, among the above-mentioned surface modifiers. Thus, it is desired to improve the surface activity of an inorganic powder.

DISCLOSURE OF THE INVENTION

The present inventors have studied the above-mentioned problems, and have discovered that a composition comprising an aged mixture of tetramethoxysilane with water added in an amount of not less than the theoretical amount sufficient for the hydrolysis and condensation of 100% of the tetramethoxysilane and a compound capable of condensing with the product of hydrolysis and condensation of the tetramethoxysilane in the above fully aged mixture, provides a satisfactory coating film having a thickness of several μm to several tens μm and also having excellent flexibility, transparency, hardness, solvent resistance and chemical resistance; that the above composition improves also adhesion to various substrates and also largely improves the surface activity of powder or particles coated therewith, thereby achieving effects of lowering an angle of repose and an affinity with various matrix and consequently providing various favorable properties in the preparation of FRP and the like; and also that the above composition provides excellent properties suitable for impregnation treatment, bonding and other various uses.

Thus, the present invention resides in a curable composition comprising an aged mixture of tetramethoxysilane with water added in an amount of not less than the theoretical amount sufficient for the hydrolysis and condensation of 100% of the tetramethoxysilane and a reactive organic compound having at least two functional groups capable of condensing with the product of hydrolysis and condensation of the tetramethoxysilane in the above mixture.

Figure 1:
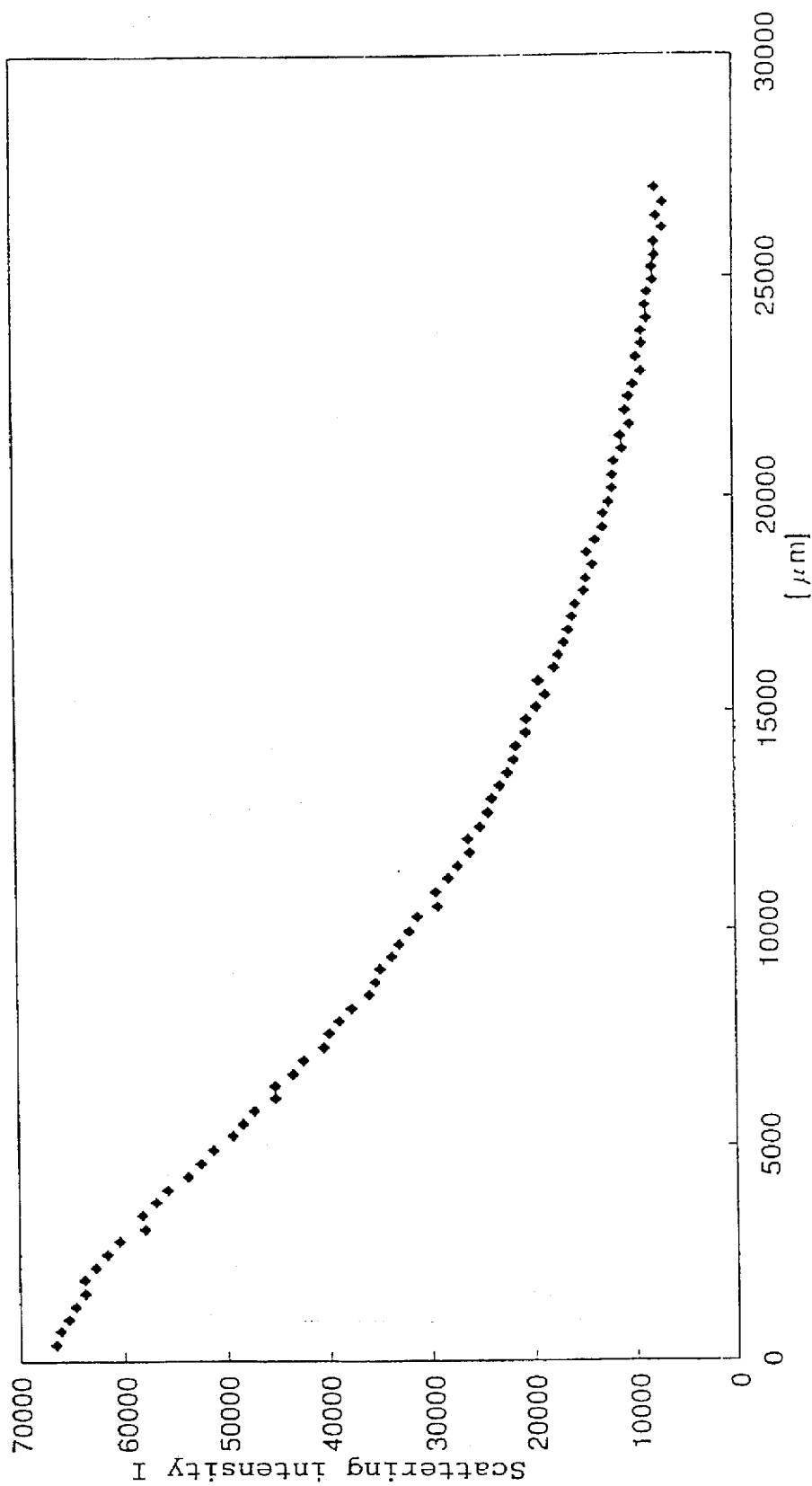
FIG. 1 shows measurement data of scattering intensity of composition A.

The present invention is described hereinafter in details.

Tetramethoxysilane used in the present invention is a monomer (represented by $Si(OCH_3)_4$) obtained by such a process as reaction of silicon tetrachloride and methanol or reaction of metallic silicon and methanol and/or their partly hydrolyzed condensate. Since impurities can be easily removed by purifying this starting material and this material does not by-produce hydrochloric acid which is liable to corrode an apparatus, it is preferable to employ tetramethoxysilane obtained by reacting silicon and methanol and/or partly hydrolyzed condensate, particularly for use which requires removal of impurities. By using this starting material, a curable composition having a chlorine content of 1 to 2 ppm or lower, for example, can be easily obtained.

It is indicated that a tetramethoxysilane monomer is remarkably poisonous and attacks cornea of eyes and even its vapor brings damages. Also, since it is highly active, it sometimes generates heat and causes bumping during operation. Further, a curable composition containing a large amount of the monomer is liable to gradually degrade its properties due to reaction of the monomer during storing.

In this regard, it is possible to attend to these problems by employing a partly hydrolyzed condensate of tetramethoxysilane (hereinafter referred to as "tetramethoxysilane oligomer") obtained by conducting partly hydrolysis-condensation of tetramethoxysilane, and the tetramethoxysilane oligomer provides a curable composition having excellent coating properties for a long term, reducing the toxicity and also excellent in workability.

Hydrolysis-condensation reaction for obtaining a tetramethoxysilane oligomer can be conducted in accordance with a known method, and can be conducted for example by adding a predetermined amount of water to the above-mentioned tetramethoxysilane monomer and reacting in the presence of an acid catalyst usually at a temperature of from room temperature to 100° C. while distilling off a by-produced alcohol. By this reaction, methoxysilane is hydrolyzed, and a liquid-like tetramethoxysilane oligomer (usually having an average polymerization degree of from 2 to 8, mostly from 3 to 7) can be obtained by condensation reaction as a partly hydrolyzed condensate. The degree of hydrolysis can be controlled adequately by the amount of water used. The degree of hydrolysis of 100% means the case wherein water is added in a theoretical amount required for hydrolysis-condensing all of hydrolyzable groups of tetramethoxysilane, i.e. in an amount of 1/2 mol number of water to mol number of a methoxy group. In the present invention, the degree of hydrolysis is selected usually in the range of from 20 to 80%, preferably from 30 to 60%. If the degree of hydrolysis is less than 20%, the remaining ratio of the monomer is too high and the productivity is low. On the other hand, if the degree of hydrolysis is more than 80%, a tetramethoxysilane oligomer is liable to gel.

The tetramethoxysilane oligomer thus obtained contains a monomer usually in an amount of from 2 to 10%. Since a curable composition containing such an amount of monomer has a poor storage stability and increases its viscosity during storing, it is preferable to remove the monomer so as to reduce the monomer content to at most 1 wt %, preferably at most 0.3 wt %. The removal of this monomer can be conducted by flash distillation, vacuum distillation or blowing of an inert gas.

In the present invention, water is blended with the above-mentioned tetramethoxysilane in an amount of not less than an amount capable of effecting 100% hydrolysis condensation of tetramethoxysilane (hereinafter referred to as "hydrolysis 100% equivalent"), i.e. in an amount of not less than an amount required for hydrolysis-condensing all of hydrolysis-condensable groups i.e. methoxy groups of tetramethoxysilane. This is also the same with regard to the case of using a tetramethoxysilane oligomer, and it is preferable to blend water in an amount of not less than an amount required for hydrolysis-condensing the remaining methoxy groups, i.e. in an amount of at least 1/2 mol number to mol number of the remaining methoxy groups.

In this manner, the amount of water may be any amount so long as it is not less than "hydrolysis 100 equivalent" amount, but it is practical to use water in an amount of from 1 to 4 times, preferably from 1 to 2 times, most preferably from 1 to 1.5 times larger than the hydrolysis 100% equivalent amount, particularly when an organic solvent such as methanol or ethanol is used as a diluent. If the amount of water exceeds 4 times larger than the hydrolysis 100% equivalent amount, the storage stability of a curable composition becomes poor depending on a case. On the other hand, if the amount of water is smaller than the hydrolysis 100% equivalent amount, coated film properties such as hardness becomes unsatisfactory.

Water to be employed is not specially limited and a city water may be employed, but it is sometimes preferable to employ a dechlorinated water or an ultra-pure water depending on an object or a use. Thus, the water is optionally selected. For example, it is preferable to employ a dechlorinated water when it is used for a substrate such as mild steel, copper or aluminum, an electronic substrate such as a barrier film including a heat-resistant film, a moisture-resistant film or a chemical-resistant film, or an electric insulating film, which is easily corroded with an acid and it is preferable to employ an extra pure water when it is used for semiconductors which require to prevent incorporation of impurities.

In the present invention, a diluent can be further added. By the addition of a diluent, a curable composition obtained thereby improves storage stability.

As the diluent, water or an organic solvent can be used depending on its object. When water is employed, the dilution may be effected by increasing the above-mentioned blending amount of water, or the resultant curable composition may further be diluted with an optional amount of water.

Also, examples of the organic solvent include alcohols, glycol derivatives, hydrocarbons, esters, ketones, ethers and the like, and one component or a mixture of two or more component may be used.

Examples of the alcohols include methanol, ethanol, isopropyl alcohol, n-butanol, isobutanol, octanol, n-propyl alcohol, acetylacetone alcohol and the like, and examples of the glycol derivatives include ethylene glycol, ethyl glycol monomethyl ether, ethylene glycol monoethyl ether, ethylene glycol mono-n-propyl ether, ethylene glycol mono-n-butyl ether, propylene glycol monomethyl ether, propylene glycol monoethyl ether, propylene glycol monobutyl ether, ethylene glycol monoethyl ether acetate, ethylene glycol monomethyl ether acetate, propylene glycol monoethyl ether acetate, propylene glycol monomethyl ether acetate and the like.

Examples of the hydrocarbons include benzene, kerosine, toluene, xylene and the like, and examples of the esters include methyl acetate, ethyl acetate, butyl acetate, methylacetoacetate, ethylacetoacetate and the like. Examples of the ketones include acetone, methyl ethyl ketone, methyl isobutyl ketone, acetyl acetone and the like, and examples of the ethers include ethyl ether, butyl ether, 2-α-methoxyethanol, 2-α-ethoxyethanol, dioxane, furan, tetrahydrofuran and the like.

Among these solvents, alcohols, particularly a $C_1$-$C_4$ alcohol such as methanol, ethanol, isopropanol or butanol, are preferable since they are easy to handle and provide a satisfactory storage stability in solution and provide a coating film having excellent properties. Further, among these solvents, by using methanol or ethanol, an extremely hard coating film can be easily obtained.

Also, when an organic solvent such as an alcohol is used as a diluent, the solvent is used in an amount of from 50 to 5000 parts by weight, preferably from 100 to 500 parts by weight to 100 parts by weight of tetramethoxysilane oligomer. If the amount of the solvent is lower than 50 parts by weight, the storage stability of a curable composition is lowered, and is liable to gel. On the other hand, if the amount of the solvent exceeds 500 parts by weight, the thickness of a coating film becomes extremely thin.

When water is used as a diluent, it is blended suitably in an amount of from 24 to 300 parts by weight (which is the total amount of the diluent amount and the above-mentioned hydrolysis 100% equivalent amount) to 100 parts by weight of tetramethoxysilane. When water is used as a diluent, gelation occurs more easily as compared with the case of using an organic solvent such as methanol or ethanol, and it is therefore preferable to prevent the gelation by maintaining a pH value of 3 or lower, preferably a pH value of from 1 to 2. Thus, the type and amount of a catalyst used are optionally selected depending on the water diluent amount while maintaining the above pH value.

In the present invention, a curing catalyst may be added if desired.

Examples of the catalyst include inorganic acids such as hydrochloric acid, nitric acid, sulfuric acid and phosphoric acid, organic acids such as acetic acid, paratoluenesulfonic acid, benzoic acid, phthalic acid, maleic acid, formic acid and oxalic acid, alkali catalysts such as potassium hydroxide, sodium hydroxide, calcium hydroxide and ammonia, organic metals, metal alkoxides, organic tin compounds such as dibutyl tin dilaurate, dibutyl tin dioctoate and dibutyl tin diacetate, metal chelate compounds such as aluminum tris(acetylacetonate), titanium tetrakis (acetylacetonate), titanium bis(butoxy)bis(acetylacetonate), titanium bis(isopropoxy)bis(acetylacetonate), zirconium tetrakis(acetylacetonate), zirconium bis(butoxy)bis (acetylacetonate) and zirconium bis(isopropoxy)bis (acetylacetonate) and boron compounds such as boron butoxide and boric acid. In order to provide a curing composition having a satisfactory storage stability and a coating film having properties of satisfactory hardness and flexibility and to prevent corrosion to a substrate to be treated, it is preferable to employ one or a mixture of two or more selected from the group consisting of acetic acid, maleic acid, oxalic acid, fumaric acid, and a metal alkoxide.

Also, the type of a preferable catalyst can be selected optionally depending on the type of a diluent, a substrate to be treated, and its use.

For example, when a strong acid such as hydrochloric acid or nitric acid is used as a catalyst, a storage stability in solution is good and a time required for the following aging can be reduced, and a coating film having an excellent hardness can be provided, but such a catalyst is not suitable for a substrate which is easily corroded. On the other hand, maleic acid is preferable since it does not cause a corrosion problem and it can prevent corrosion of FRP products when used for treating powders and particulate materials. Further, it can reduce relatively the aging time and can provide a coating film having a satisfactory hardness and a particularly excellent storage stability in solution.

Also, when methanol or ethanol is used as a diluent, a satisfactory storage stability in solution can be maintained and a cured product having a satisfactory hardness can be obtained, even when in addition to the above-mentioned acid catalyst, a metal acetylacetonate compound such as aluminum tris(acetylacetonate), titanium tetrakis (acetylacetonate), titanium bis(butoxy)bis(acetylacetonate), titanium bis(isopropoxy)bis(acetylacetonate), zirconium tetrakis(acetylacetonate), zirconium bis(butoxy)bis (acetylacetonate) and zirconium bis(isopropoxy)bis (acetylacetonate), is used.

The amount of such a catalyst component is not specially limited so long as it achieves a catalyst function, but is generally selected from the range of from 0.1 to 10 parts by weight, preferably from 0.5 to 5 parts by weight to 100 parts by weight of tetramethoxysilane.

A method for blending these components is not specially limited, and a solution having the catalyst component previously dissolved in water may be used or a catalyst component may be blended while stirring to obtain a more homogeneous blend. Also, if a catalyst which is easily decomposable with water or other solvents is used, it is preferable to blend the catalyst with tetramethoxysilane in advance and then to blend the mixture with water or other solvents when it is actually used. Further, a catalyst component may be added to other components when it is used.

In the present invention, a blended solution obtained by blending these components (hereinafter referred to as "blended solution") is preferably subjected to aging.

Such an aging step is considered to satisfactorily proceed with hydrolysis of tetramethoxysilane and partial crosslinking reaction by condensation to form the following fine particles which provide a curable composition having excellent properties.

The aging of the blending solution can be conducted by allowing the solution to stand or by stirring the solution. The time allowed to stand the solution is a time sufficient for proceeding the above-mentioned partial crosslinking reaction to such a degree as to provide satisfactory film properties, and also depends on the type of a diluent and the type of a catalyst used. For example, when methanol and/or ethanol are used as a diluent, the aging time is about at least 1 hour at room temperature in the case of using hydrochloric acid, and is at least a few hours, preferably from 8 hours to 2 days in the case of using maleic acid.

Also, when water is used as a diluent, it is preferable to conduct hydrolysis for from 1 to 180 minutes, usually from 10 to 20 minutes under stirring while maintaining a pH value of at most 3, preferably a pH value of from 1 to 2, thereby producing a transparent homogeneous solution. After obtaining the transparent solution in this manner, the solution is further allowed to stand for 1 to 2 hours for aging.

The aging time is influenced also by environmental temperature, and it is sometimes preferable to heat the solution to around 20° C. at an extremely cold place. Generally, the aging proceeds rapidly at a high temperature, but a suitable heating temperature is at most 50° to 60° C. since the solution causes gelation when it is heated to 100° C. or higher.

By fully conducting the aging, whitening or peeling of a film obtained can be avoided. Generally, the aging is sufficient if the solution is allowed to cool to room temperature after heat-generation by hydrolysis is finished and is allowed to stand for a time required to finish partial crosslinking reaction. In the blending solution of the present invention thus aged (hereinafter referred to as "aged material"), fine particles having a radius of gyration of at most 10 Å (hereinafter referred to as "reactive ultrafine particulate silica") are formed, and the formation of reactive ultrafine particulate silica can be easily identified by means of a small angle X-ray scattering goniometer. Thus, the presence of fine particles provides a diffraction intensity distribution of incident X-ray which shows diffuse scattering called as central scattering in the incident line direction, i.e. small angle X-ray scattering. The scattering intensity I is provided by the following Guinier equation.

$$I=C_{exp}(-H^2 Rg^2/3)$$

(I: scattering intensity, H: scattering vector ($2\pi\sin 2\theta/\lambda$), Rg: radius of gyration of fine particles, C: Const, $\lambda$: incident X-ray wavelength, $2\theta$: divergent angle)

If common logarithm is applied to both members of the above Guinier equation, it becomes as follows:

$$\log I=\log C-(H^2 Rg^2/3)$$

Thus, when fine particles are present, the radius of gyration of the fine particles can be determined by measuring scattering intensity, preparing log-log graph in respect to scattering vector and measuring inclination.

In the measurement of radius of gyration, a measurement error sometimes occurs to some degree, depending on the concentration of a solution to be measured. In order to be precise, the radius of gyration of the reactive ultrafine particulate silica of the present invention may be at most 10 Å even when measured at a silica conversion concentration of 0.3%. Particularly, when hydrolysis is conducted in the presence of an organic solvent such as ethanol as a diluent by adding water in an amount larger than hydrolysis 100% equivalent, the reactive ultrafine particulate silica thus obtained may have a radius of gyration of at most 6 Å and is extremely small and stable, even when measured under the above-mentioned condition.

Also, the reactive ultrafine particulate silica of the present invention has a weight average molecular weight of from 1000 to 3000 measured by GPC in terms of standard polystyrene conversion. Also, many of them have a weight average molecular weight of about 1300 to 2000. The molecular weight of the reactive ultrafine particulate silica varies to some degree depending on the conditions of hydrolysis condensation conducted by adding water of hydrolysis 100% equivalent, particularly the presence or absence of a diluent and the type of the diluent. For example, when hydrolysis is conducted in the presence of an organic solvent such as alcohol as a diluent, a reactive ultrafine particulate silica having a weight average molecular weight of about 1300 to 1800 can be stably obtained.

(The above-mentioned molecular weight is a weight average molecular weight determined in terms of standard polystyrene conversion based on the measurement by GPC.)

As mentioned above, since the reactive ultrafine particulate silica of the present invention has an extremely small radius of gyration relative to its molecular weight, it is presumed to be a silica having an ultra-dense structure of specific unique form. Also, the reactive ultrafine particulate silica of the present invention has many hydrolysis-condensable reactive functional groups such as a hydroxyl group and an alkoxy group. For example, when hydrolysis is conducted in the presence of ethanol as a diluent by adding water of hydrolysis 100% equivalent, a reactive ultrafine particulate silica having a hydroxyl group, a methoxy group and an ethoxy group can be obtained due to alcohol exchange reaction. For example, a reactive ultrafine particulate silica having a hydroxyl group in an amount of 0.6 time or 0.7 time or at least 0.8 time mol to the total mol number of a methoxy group and an ethoxy group, or having an ethoxy group in an amount of 1.5 time or at least 2 time mols to the mol number of a methoxy group, can be easily obtained. Such a reactive ultrafine particulate silica of the present invention as having a large amount of various reactive functional groups is highly reactive, and provides excellent properties when used in combination with various organic components. Thus, a curable composition of the present invention obtained by blending an aged material of the present invention containing reactive ultrafine silica particles with the following reactive organic compounds, has an excellent crosslinking reactivity among the components, and is curable even at normal temperature and film-formable outdoors. Also, the curable composition has such a high crosslinking density among the components as to form a cured product having a high hardness and other excellent properties. Also, even when hydrolysis is conducted in the absence of an organic solvent as a diluent, the reactive ultrafine particulate silica formed thereby has a large number of hydroxyl groups and methoxy groups. Thus, an aged material containing this reactive ultrafine particulate silica also provides a cured product having excellent properties including a high hardness, and since this composition does not substantially contain an organic solvent, this is suitably used in an environment where an organic solvent is not desired.

An aged material having the reactive ultrafine particulate silica of the present invention dispersed in water or other liquid is unexpectedly colorless and transparent and does not cause Tyndall phenomenon, and is a homogeneous liquid-like composition having a viscosity of about 0.5 to 10 cps and its silica concentration can be made to 36 wt %. Moreover, this aged material is stable, and can be stored for at least 12 months at room temperature under sealed condition without causing any visual change.

By adding a suitable catalyst or solvent, a composition stable in a wide pH range from strongly acidic to strongly alkaline zone can be obtained.

Also, water or other various solvents or dispersion medium can be added to the above-mentioned aged material. Particularly when water is used as a diluent for obtaining a blended solution and a pH value is made at most 3, it is desirable to add these components for convenient use and to make the solution a weak acid of a pH of about 3 to 5. In a state of a strong acid of a pH of at most 3, it is inconvenient for practical use. Also, if the solution is made neutral or alkaline, it is liable to gel and tends to cause a storage stability problem. When water is added as a diluent and water is further added after aging, the total amount of water blended is usually from 200 to 100,000 parts by weight, preferably from 350 to 35,000 parts by weight to 100 parts by weight of tetramethoxysilane. If the amount of water is less than 200 parts by weight, a coating composition obtained therefrom provides a poor storage stability, and a coating film obtained therefrom becomes too thick and tends to cause cracks. On the other hand, if the amount of water is more than 100,000 parts by weight, a coating obtained therefrom becomes extremely thin. Also, when an organic solvent such as alcohol is used as a diluent, a storage stability becomes more satisfactory since an OH concentration in the vicinity of fine particles becomes lower than in the case of using water as a diluent, and it is therefore possible to add the following reactive organic compounds to the aged material as it is.

In the present invention, to the above-mentioned aged material, was blended a reactive organic compound having at least two functional groups capable of condensing with the above-mentioned aged material. Thus, fine particles in the aged material of the present invention have many hydrolysis-polycondensable reactive groups such as a hydroxyl group and an alkoxy group. In the present invention, a reactive organic compound having at least two functional groups hydrolysis-polycondensable with these reactive groups is blended with the aged material.

Examples of such a reactive organic compound include a compound having at least two functional groups such as a carboxyl group, a hydroxyl group, an amino group and an alkoxy group (except for tetramethoxysilane), particularly, (i) silane couplers (generally RSiX₃ wherein X is a hydrolyzable group and R is a functional group),
(ii) alkylalkoxysilicones,
(iii) acryl resin, epoxy resin, polyester resin, urethane resin or other polymers, having at least two of the above-mentioned groups or an epoxy structure, and
(iv) polyhydric alcohols such as 1,4-butanediol, glycerin, catechol and resorcin.

Particularly, examples of the silane couplers (i) include:

a methyl acrylate type silane coupler such as

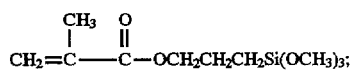

an epoxy type silane coupler such as

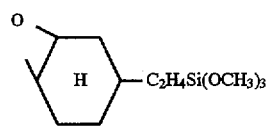

and

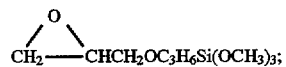

an amino type silane coupler such as
$H_2NC_3H_6Si(OC_2H_5)_3$,
$H_2NC_2H_4NHC_3H_6Si(OCH_3)_3Si(OCH_3)_3$ and
$H_2NCONHC_3H_6Si(OC_2H_5)_3$;

a vinyl type silane coupler such as
$CH_2=CHSi(OC_2H_5)_3$,
$CH_2=CHSi(OCH_3)_3$ and
$CH_2=CHSi(OC_2H_4OCH_3)_3$;

a mercapto type silane coupler such as
$HS-C_3H_6Si(OCH_3)_3$, $HS-C_3H_6Si(OC_2H_5)_3$ and
$HS-C_3H_6Si(OC_2H_4OCH_3)_3$;
and the like.

Each of the above examples can be favorably used, but is optionally selected depending on the type of a substrate to be coated.

For example, a coating film excellent in adhesion can be obtained when using a methyl acrylate type silane coupler for an acrylic resin substrate, a vinyl type silane coupler for other general resin substrates, and an epoxy type silane coupler for a metal substrate. When a substrate is a glass substrate, any type of silane couplers can be used for providing an excellent adhesion.

Examples of the alkylalkoxysilicones (ii) include:

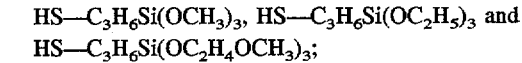

n, m=1 to 10

Examples of the polymers (iii) include:
① Acrylic resin

(b) Acrylic resin having γ-MTS (γ-methacryloxypropyltrimethoxysilane) added to the above VP structure:

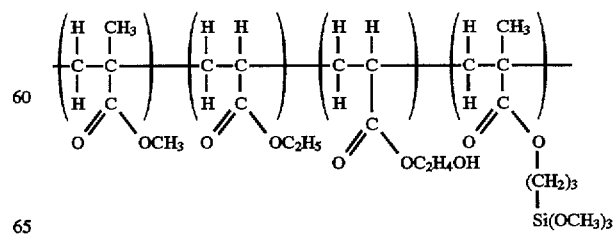

② Epoxy resin

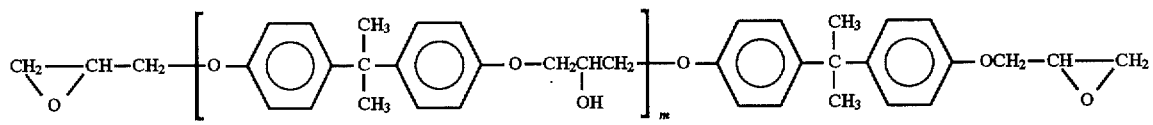

m = 0 (M = 340), m = 1 (M = 620)

③ Polyester resin

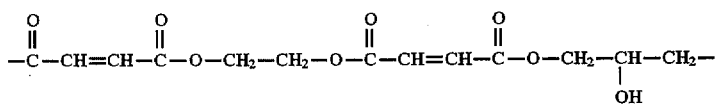

④ Polyurethane resin

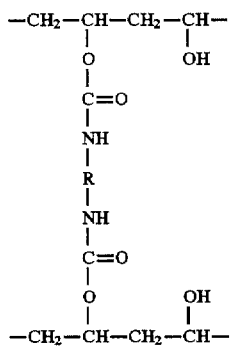

The above illustrated examples are examples of the reactive organic compound used in the present invention, but the reactive organic compound usable in the present invention is not limited to the above examples. Any reactive organic compound is usable in the present invention so long as it has at least two functional groups capable of condensing with the product of hydrolysis and condensation of tetramethoxysilane in the above aged material, as mentioned above.

Also, the above reactive organic compounds may be used in combination of two or more compounds, depending on an object.

For example, a combination of a resin component and a silane coupler such as a combination of an epoxy resin and an epoxy type silane coupler, a combination of an acrylic resin and an acryl type silane coupler and a combination of a polyester resin and an epoxy type silane coupler, can be favorably used to provide a coating film having improved properties such as an improved adhesion to a substrate and an improved compatibility between a resin component and tetramethoxysilane. Thus, such a combination can be optionally selected depending on an object. When using, at least two components may be previously blended or each component may be added to an aged material.

The reactive organic compound is added in an amount of from 1 to 300 parts by weight, preferably from 4 to 150 parts by weight as a solid content to 100 parts by weight of the aged material. Particularly when a $SiO_2$ concentration in the film is from 94 to 5%, preferably from 80 to 10%, excellent film properties can be obtained and a satisfactory storage stability of the solution can be provided.

If the amount of the reactive organic compound is too large, the hardness of a coating film obtained tends to become low. On the other hand, if the amount of the reactive organic compound is too small, the flexibility of a coating film obtained tends to become low and is liable to cause cracks.

When a silane coupler is used as the reactive organic compound, water is added to hydrolyze the coupler. Water may be added together with the silane coupler, or may be previously added together with water to be previously added for hydrolyzing tetramethoxysilane in an amount of at least 100% equivalent for hydrolysis.

When blending the aged material and the reactive organic compound, if necessary, a solvent, a dispersion medium and a curing catalyst may be added.

For example, when forming a film as mentioned below, particularly in the case of spraying method or dipping method, these solvents or dispersion media can be added to adjust a viscosity or a non-volatile component content of a coating solution, depending on the coating conditions or the aimed film properties such as a film thickness.

A solvent having a compatibility with both an aged material and a reactive organic compound is preferable, examples of which include alcohols, glycol derivatives, hydrocarbons, esters, ketones and ethers, and these are used respectively alone or in a mixture of two or more.

Examples of the alcohols include methanol, ethanol, isopropyl alcohol, n-butanol, isobutanol and octanol, and examples of the glycol derivatives include ethylene glycol, ethylene glycol monomethyl ether, ethylene glycol monoethyl ether, ethylene glycol mono-n-propyl ether and ethylene glycol mono-n-butyl ether.

Examples of the hydrocarbons include benzene, kerosine, toluene and xylene, and examples of the esters include methyl acetate, ethyl acetate, butyl acetate, methyl acetoacetate and ethyl acetoacetate. Also, examples of the ketones include acetone, methyl ethyl ketone, methyl isobutyl ketone and acetyl acetone, and examples of the ethers include ethyl ether, butyl ether, 2-α-methoxyethanol, 2-α-ethoxyethanol, dioxane, furan and tetrahydrofuran.

If desired, a dispersion medium can be used. A preferable example of the dispersion medium includes a water-surfactant type dispersion medium, and a general example of the surfactant includes an anionic, cationic or nonionic surfactant. Examples of the anionic surfactant include a carboxylate salt, a sulfonate salt, a sulfonic acid ester salt and a phosphoric acid ester, and examples of the cationic surfactant include a primary to tertiary amine-organic or inorganic acid salt, a quaternary ammonium salt and a polyoxyethylene alkylamine salt, and examples of the nonionic surfactant include a sorbitan dialkylester, a sorbitan alkylester-ethylene glycol condensate, an aliphatic alcohol polyethylene glycol condensate, an alkylphenol polyethylene glycol condensate and a polypropylene glycol polyethylene glycol condensate.

These surfactants are used generally in an amount of from 0.1 to 5% to the above aged material, and dispersion (emulsification) can be made with an appropriate amount of water by using a homomixer, a colloid mill, an ultrasonic device or other known means.

A preferable amount of a hydrolyzate to be blended, is from 50 to 300 parts by weight, more preferably from 100 to 250 parts by weight to 100 parts by weight of an organic compound copolymer resin. If this amount is less than 50 parts by weight, a flexural rigidity is unfavorably lowered, and if this amount exceeds 300 parts by weight, an adhesion to a substrate is unfavorably lowered.

Among these solvents and dispersion media, it is usually preferable to employ a solvent since it provides satisfactory physical properties of a cured product and a satisfactory stability of a curable composition. The type of a solvent used is selected depending on the aimed property of a cured product and treating conditions. For example, when hydrocarbons such as benzene, toluene and xylene or ketones such as methyl ethyl ketone are used for forming a film, a film having an excellent surface gloss and a desired film thickness can be easily obtained since a solvent removal rate at the time of curing a film is appropriate. In other aspects, generally, it may be optionally selected depending on the type of a reactive organic compound used and a desired film property.

When a reactive organic compound has many functional groups, it may be desired to add an additional catalyst for improving a curing rate after treatment, but a catalyst added at the time of forming an aged material will generally suffice.

When these solvents and catalysts are used, the order of their addition is not specially limited, and they may be added to tetramethoxysilane, together with a reactive organic compound, or they may be added after achieving such a compatible state as mentioned below.

A method for blending an aged material and a reactive organic compound is not specially limited, but after adding the reactive organic compound to the aged material, the resultant mixture is allowed to stand for a predetermined time in order to maintain reactive ultrafine silica in the aged material and the reactive organic compound in a desired compatible state so that satisfactory film properties including transparency can be achieved, when the mixture is used for coating on a substrate. By allowing the mixture to stand, fine particles having reactive groups such as a hydroxyl group and an alkoxyl group formed in the aged material and the reactive organic compound having functional groups reactive therewith become a compatible state by bonding with a hydrogen bond and by partly reacting in the presence of a solvent having a compatibility with the two. When the coating solution thus obtained is made into a film, the reaction between the fine particles and the functional groups of the reactive organic compound is accelerated together with the evaporation of a solvent, thereby forming a transparent coating film having a high hardness.

The time required for allowing the mixture to stand varies depending on the kind of an organic compound used, the size of the molecule, and the amount and kind of a functional group. For example, in the case of an organic compound having a relatively small molecular weight such as a silane coupler, about one hour will suffice, but in the case of a resin having a large molecular weight, it is necessary to be allowed to stand for a few days. If a coating solution is allowed to stand for a sufficient time, a transparent coating film can be obtained after film formation, thereby being able to recognize that each component in the coating solution is in a compatible state. The time of being allowed to stand required for achieving a compatible state can be reduced by heating or stirring without gelling. The coating solution of the present invention thus obtained is coated on a substrate or a wire material such as polymer, metal, ceramic or the like by means of impregnating method, spin coating method, dipping method, spraying method and the like to form a film, or the coating solution may be mixed with powders to form a film. In the film formation, the coating solution is coated, and it is then allowed to stand at room temperature for 1 to 10 minutes to remove the solvent. Thereafter, it is heated to proceed a crosslinking reaction between each component in the coating solution by dehydration-condensation reaction to cure the coated film, but a coating method is not especially limited but can be optionally selected depending on an object.

For example, when directly heating without previously removing a solvent at room temperature, a coated film surface can be made smooth by optionally adding additives such as a defoaming agent, a leveling agent, and a solvent having an evaporation rate suitable for being used under conditions including a curing temperature. Also, a heating temperature is not specially limited, but a low temperature may be employed if a sufficient time is taken. Crosslinking can be carried out usually at a temperature in a wide range of from $-20°$ C. to $300°$ C., but practically in a range of from $20°$ C. to $200°$ C. The time required for curing depends on a catalyst used, but a coating film having a sufficient hardness can be obtained efficiently by heating at about $150°$ C. for a few minutes. A heating furnace used may be a gas furnace, an electric furnace or other commonly used furnaces. Also, in the coating solution of the present invention, the hydrolyzate of tetramethoxysilane forms fine particles by sufficient aging, and is therefore compatible with an organic component such as resin, thereby becoming excellent in the reaction rate and the proceeding degree of crosslinking reaction. Thus, by drying at normal temperature to remove a solvent without any special heating step, each component in the solution conducts a crosslinking reaction to obtain a coating film having a sufficiently high hardness, and therefore, the coating solution of the present invention is suitable also for being used outdoors.

Also, when the coating is cured by drying at normal temperature, it takes a little longer time than in the case of heating, but it is usually sufficient if it is allowed to stand for 12 hours.

Since the curable composition of the present invention has a satisfactory recoatability, the coating solution may be recoated after drying depending on its use, and may be further dried, but the curable composition of the present invention can provide a film thickness of at least 10 μm by one time coating.

The coating may be carried out by normal method, and a coating thickness can be optionally selected.

The selection of a coating thickness can be carried out by normal method, for example, by adjusting the concentration of a non-volatile component in the solution, the viscosity of the solution, the taking-up speed of dipping method and the spraying time of spraying method or by conducting recoating. Also, the film thickness can be largely varied by appropriately selecting a reactive organic compound used.

In the case of a paint having pigments dispersed, if a reactive organic compound is previously dispersed, a silicon-containing coating film having pigments uniformly dispersed can be obtained.

When various powders are treated with the curable composition of the present invention, it can be done by a general wet or dry method. For example, it is favorable for the dry method to use an apparatus suitable for drying and equipped with a mixing stirrer such as a Henschel mixer. The starting powders and a predetermined amount of the curable composition are charged, and the resultant mixture is stirred at room temperature until the surface of the starting powders is sufficiently wetted. Thereafter, while continuously stirring the mixture, the mixture was heated at 100° to 150° C. to conduct crosslinking reaction of the curable composition and to evaporate volatile components such as water, thereby obtaining surface-treated powders. If it is difficult to uniformly wet the starting powders with a predetermined amount of the curable composition, a predetermined amount of the curable composition may be diluted with water or the like. Also, in order to improve an affinity with a matrix, the starting powders may be previously surface-treated with a hydrolysis-condensate condensate of an alkoxysilane, particularly tetramethoxysilane, or with an aged material used in the present invention and/or a solution of the aged material diluted with water, and may be further treated with the curable composition of the present invention after drying, if necessary.

The curable composition of the present invention has an excellent affinity with various substrates, and therefore, the starting powders to be treated with the curable composition of the present invention are not specially limited, examples of which include glass, cement, concrete, metals such as iron, copper, nickel, gold, silver, aluminum, rare earth metal and cobalt, carbonaceous materials such as carbon black, graphite, carbon fiber, activated carbon and carbon hollow spheres, oxides such as silica, alumina, titanium oxide, beryllium oxide, iron oxide, zinc oxide, magnesium oxide, tin oxide, antimony oxide, barium ferrite and strontium ferrite, hydroxides such as aluminum hydroxide and magnesium hydroxide, carbonates such as calcium carbonate and magnesium carbonate, sulfates such as calcium sulfate, silicates such as talc, clay, mica, calcium silicate, glass, glass hollow spheres and glass fibers, various inorganic powders such as calcium titanate, lead titanate-zirconate, aluminium nitride, silicon carbide and cadmium sulfide, wood powder, starch, various organic pigments, organic fillers such as polystyrene and nylon, and the like. Thus, both generally used fillers and functional fillers providing electroconductivity, electromagnetic wave-shielding property, magnetic property, sound-insulating property, heat conductivity, flame-retardant property, nonflammable property and wear resistance, can be treated with the curable composition of the present invention. The powders thus treated with the curable composition of the present invention are used as fillers for paints such as oil paint, synthetic resin paint, water soluble resin paint, emulsion paint, aggregate-containing emulsion paint, traffic paint, putty and caulking, rubber products such as shoe sole, electric wire, tire, industrial product, belt, hose, rubber-coated cloth, rubber cement, adhesive tape, latex and back sizing, paper uses for coating, lining and synthetic paper, synthetic resin products such as PVC, polyolefin, epoxy-phenol resin and unsaturated polyester, electric welding bar, glass, acid-neutralizing agent, pharmaceuticals, foods, sugar refining, tooth paste, cleanser, bunker sand, agricultural chemicals, assorted feeds, building materials and the like, or may be used as fillers for fibers and resin components to be molded for obtaining FRP (fiber reinforced plastic).

When a porous substrate such as paper is impregnated with the curable composition of the present invention, the substrate is dipped in the curable composition and is then dried. When crosslinking reaction is conducted at normal temperature or under heating, flame retardant property and smoothness can be provided. When the curable composition of the present invention is used as an adhesive, the surface to be bonded is coated with the curable composition and the surfaces to be bonded are press-bonded before completely curing. If the surface to be bonded is precoated with the aged material of the present invention, the bonding strength is further increased.

EXAMPLES

Hereinafter, the present invention is further illustrated by the following Examples. Parts and % used herein mean parts by weight and wt % unless otherwise specified.

Example 1
(Preparation of dechlorinated water)

Industrial water of Kitakyushu-shi was sterilized with chlorine, and floating materials were separated by a coagulating sedimentation apparatus using polyaluminum chloride as a flocculating setting agent. The industrial water was then filtrated by a sand filter to obtain a filtrated industrial water. The filtrated industrial water thus obtained was treated with a cation exchange resin, and was then degassed under vacuum condition. The industrial water thus treated was further treated with an anion exchange resin and then with anion-cation exchange resins to obtain a degassed dechlorinated water having a value of at most 0.05 µsiemens/cm, pH of 6 to 8, an $SiO_2$ concentration of at most 20 µg/l, an Fe concentration of at most 20 µg/l, an Al concentration of at most 20 µg/l and a Cl concentration of at most 20 µg/l.

(Synthesis of tetramethoxysilane oligomer)

234 g of tetramethoxysilane and 74 g of methanol were placed and mixed in a 500 ml round bottom flask equipped with a stirrer, a reflux condenser and a thermometer, and 22.2 g of 0.05% hydrochloric acid was added thereto, and the resultant mixture was subjected to hydrolysis condensation reaction at an internal temperature of 65° C. for 2 hours.

Thereafter, the condenser was replaced by a distillation tube, and the internal temperature was raised to 130° C. to distill off methanol. In this manner, a partly hydrolyzed condensate was obtained (partial hydrolysis rate=40%). An oligomer having a polymerization degree of 2 to 8 was identified, and its weight average molecular weight was 550.

A monomer amount of the partially hydrolyzed condensate thus obtained (hereinafter referred to as "tetramethoxysilane oligomer") was 5%. The tetramethoxysilane oligomer was placed in a flask heated to 130° C., and a gasified monomer was taken out of the system, together with an inert gas, and the temperature was raised to 150° C. and maintained for 3 hours. After removing the monomer, the tetramethoxysilane oligomer thus obtained had a monomer amount of 0.2%.

(Preparation of curable composition)

49.31 g of ethanol was added to 34.99 g of the above obtained tetramethoxysilane oligomer, and 0.38 g of maleic acid and 8.32 g of dechlorinated water were then added thereto. The amount of water was 127% to an amount capable of theoretically completely hydrolyzing the tetramethoxysilane oligomer. The resultant mixture was allowed to stand at room temperature for 2 days to obtain an aged material. Thereafter, 7.00 g of a silane coupler having the following structural formula (Product No. A-187 manufactured by Nihon Uniker K. K.) was added thereto, and the resultant mixture was allowed to stand for 2 hours to obtain a curable composition.

An aluminum substrate (JIS1100, thickness=0.1 mm) was dipped in the above obtained curable composition, and was taken up at a rate of 10 mm/sec. The substrate thus coated was heat-cured at 150° C. for 1 hour in an electric furnace. The coating thus obtained had a thickness of 3.4 μm and a pencil hardness of 9H, and did not cause cracking even when subjected to 180° C. bending by SUS304 bar having a diameter of 6 φmm. Chemical resistance was checked by dropping 5% aqueous $H_2SO_4$ on the coating film and allowing the film to stand for one day, but there was no visual change.

Also, the curable composition was allowed to stand for 22 weeks, but there was no viscosity change.

(Identification of fine particles)

The aged product obtained in the above (Preparation of curable composition) (Composition A: $SiO_2$ conversion concentration=16 wt %, 8.1 vol %) and a solution prepared by diluting the aged product to about 4 times with ethanol (Composition B: $SiO_2$ conversion concentration=4.3 wt %, 2 vol %) were subjected to analysis by small angle X-ray scattering under the following conditions.

Measurement apparatus: Kratky Compact Camera manufactured by Anton Paar Co.

X-ray source: 50 kV, 200 mA, Cu-Kα ray was modified to be monocolor by Ni-filter.

Optical conditions: distance between sample and light-receiving slit=20 cm, internal vacuum path=19 cm, entrance slit=80 μm, light-receiving slit=200 μm, beam length=16 mm Sample cell: quartz capillary (diameter=about 1 mm, thickness=10 μm)

Other conditions: room temperature, step scan method operation range 2θ=0.086–8.1 deg 90 sec/point Data correction: background correction was effected by using scattering at the time of filling water into the quartz capillary. X-ray absorption correction was also made.

Analytical software: slit correction and inverse Fourier transformation were made by employing analytical software ITP-81 (O. Glatter; J. Appl. Cryst., 10. 415–421 (1977)).

Figure 2:
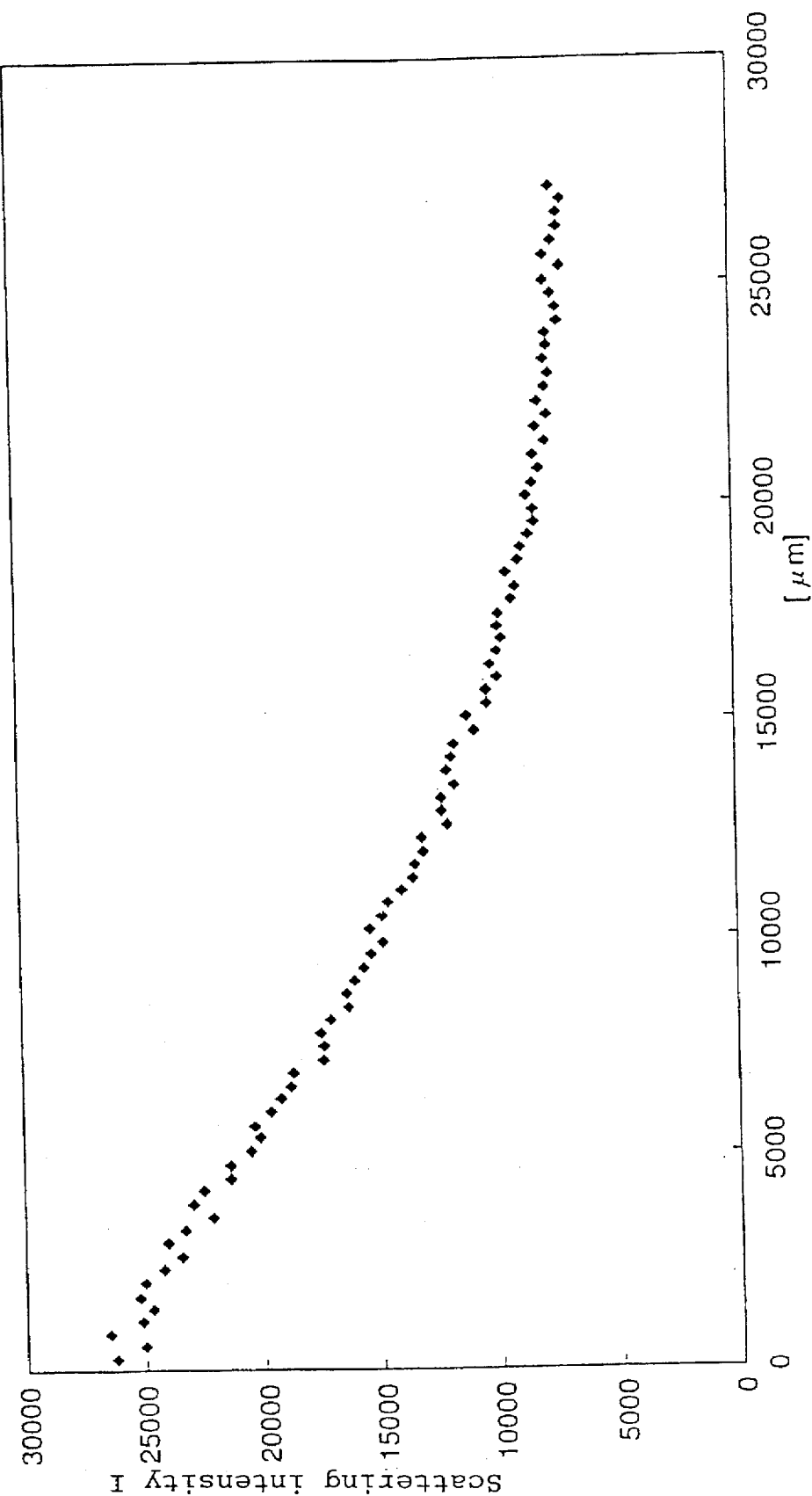
FIG. 2 shows measurement data of scattering intensity of composition B.

FIG. 1 and FIG. 2 illustrate measurement data of scattering intensity to shifting distance of scattering X-ray by light-receiving slit respectively with regard to composition A and composition B (background correction and absorption correction were made).

Figure 3:
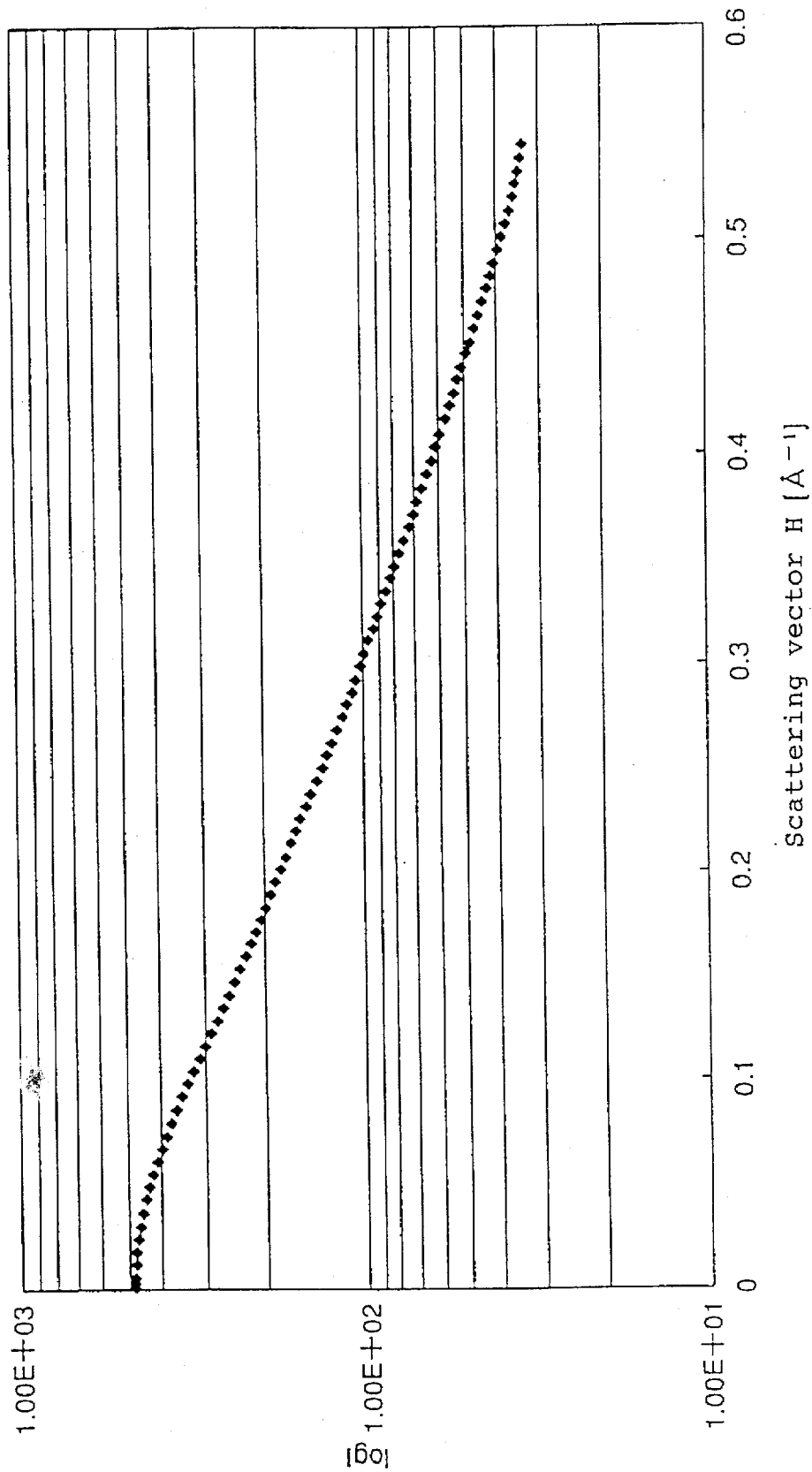
FIG. 3 shows point beam data after slit amendment of composition A.
Figure 4:
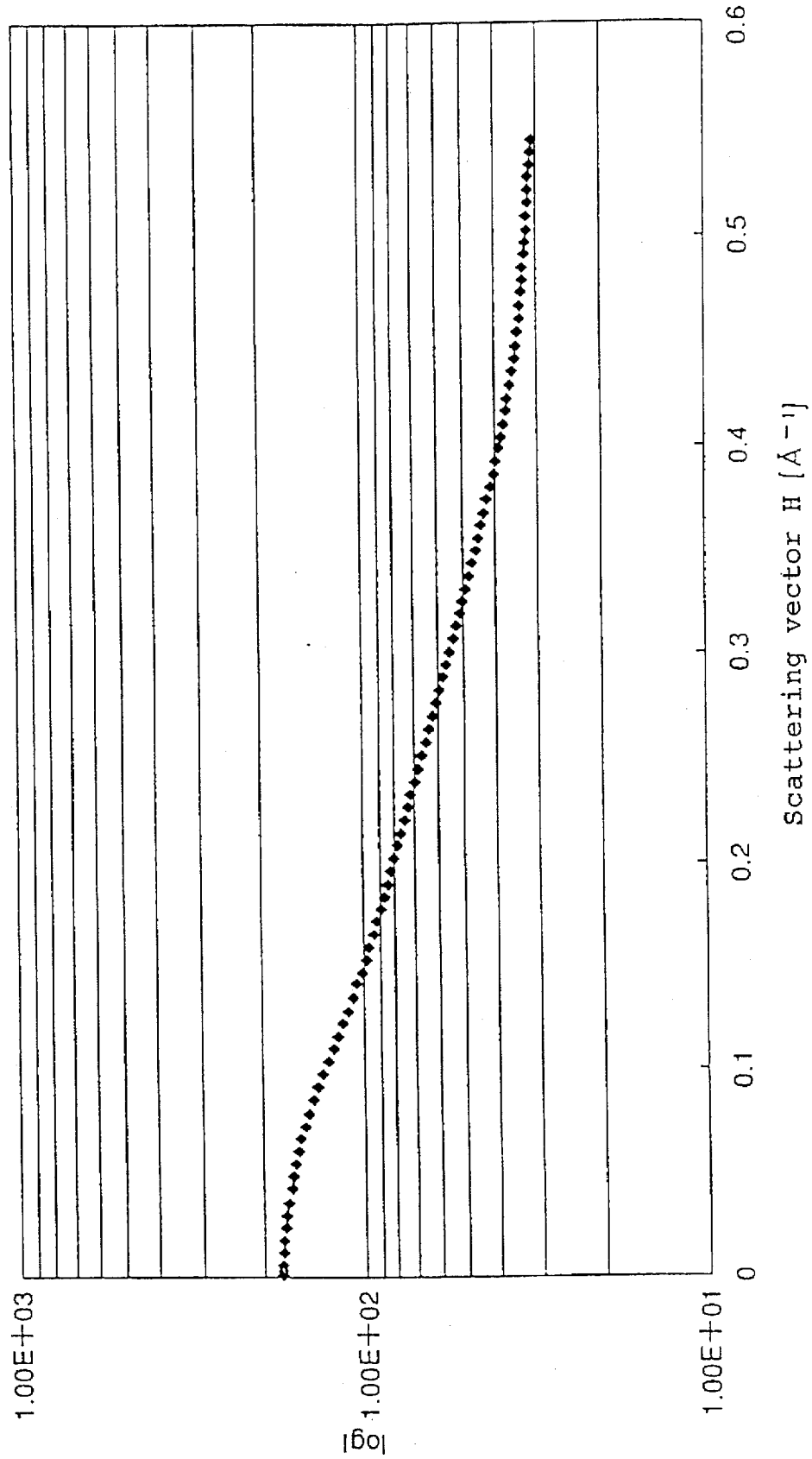
FIG. 4 shows point beam data after slit amendment of composition B.

FIG. 3 and FIG. 4 illustrate point beam data after slit correction respectively with regard to composition A and composition B.

Figure 5:
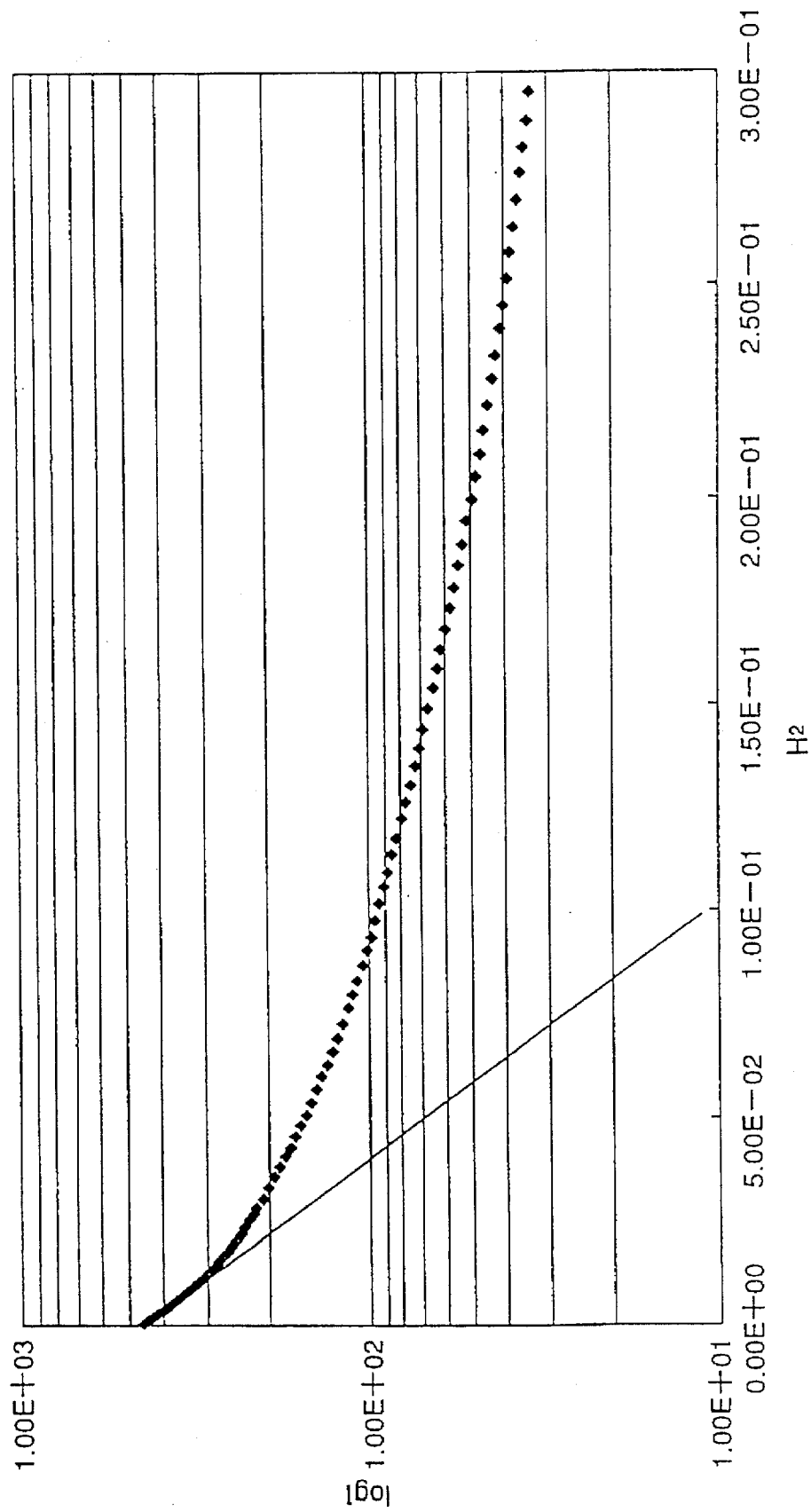
FIG. 5 shows distribution of radius of gyration of fine particles in composition A.
Figure 6:
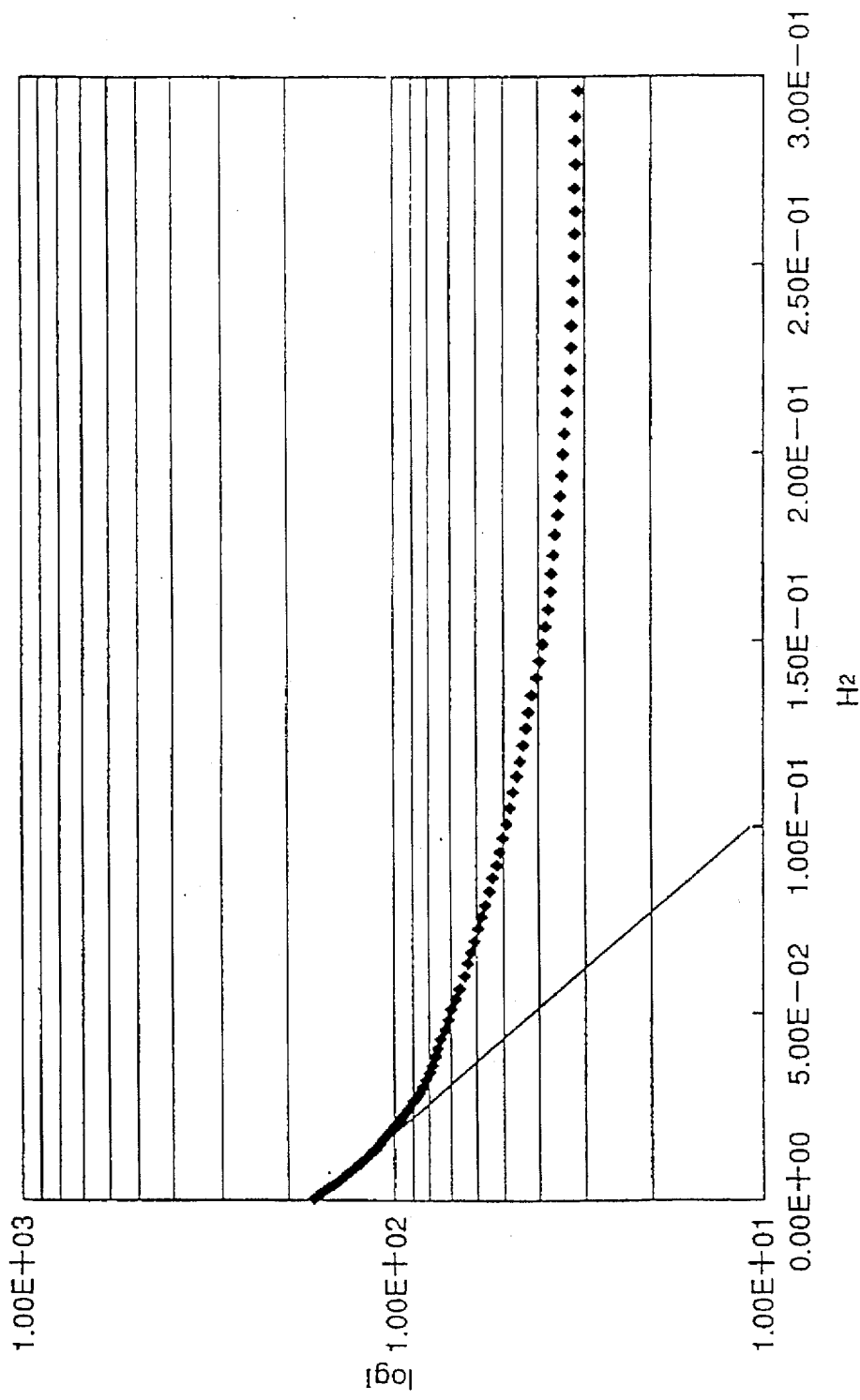
FIG. 6 shows distribution of radius of gyration of fine particles in composition B.
Figure 7:
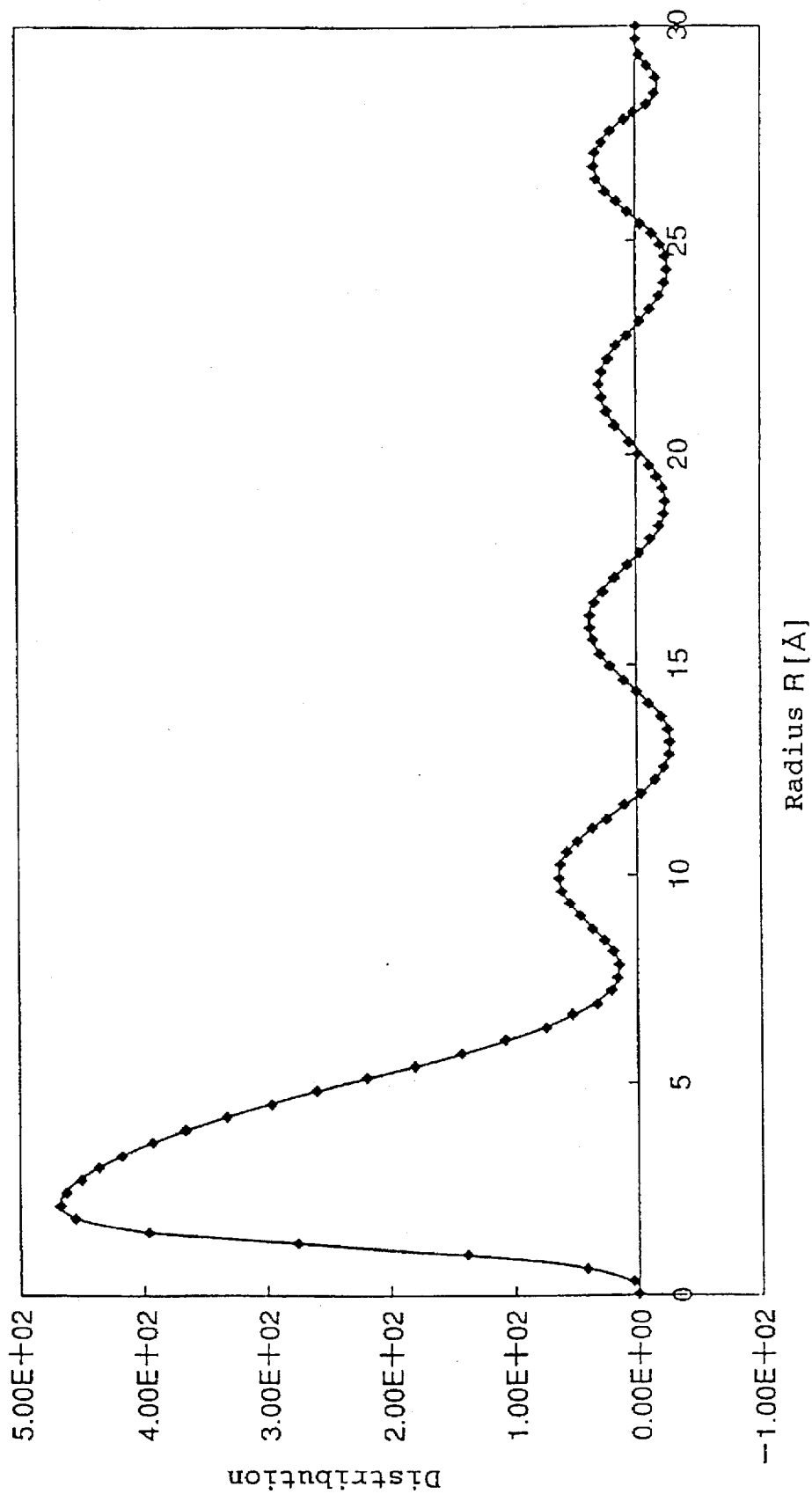
FIG. 7 shows distribution of sphere-assumed radius of fine particles in composition A.
Figure 8:
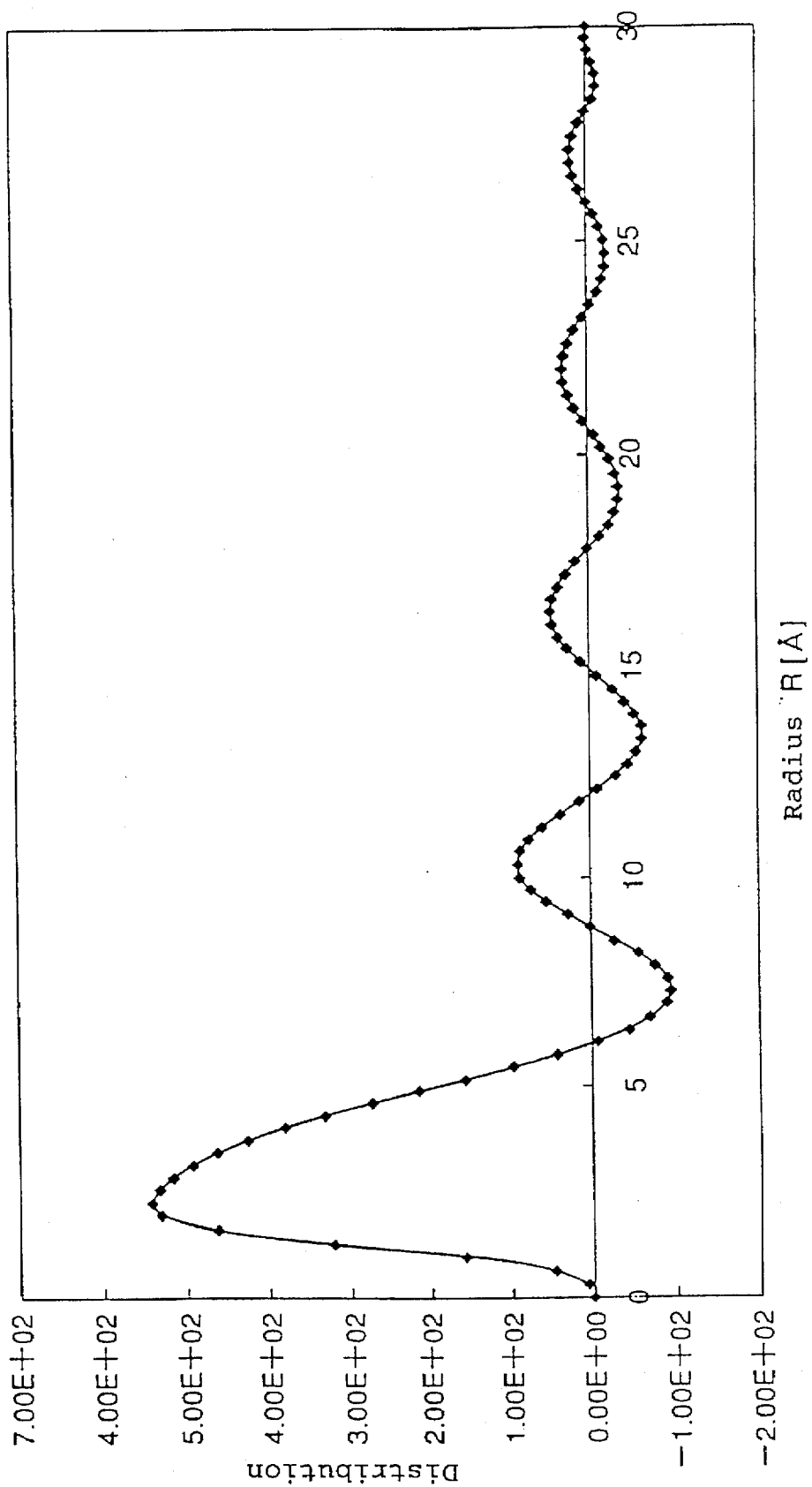
FIG. 8 shows distribution of sphere-assumed radius of fine particles in composition B.

From these FIG. 3 and FIG. 4, the maximum value of a radius of gyration was determined in accordance with Guinier equation, $I=C_{exp}(—H^2Rg^2/3)$ (I: scattering intensity, H: scattering vector $(=2\pi sin2\theta/\lambda)$, Rg: radius of gyration, C: Const, A: Cu-Kα ray wavelength, 2θ: divergent angle), and the value of composition A was 7.0 Å (sphere-assumed radius=9.0 Å according to real radius $R=(5/3)^{1/2}$ Rg) and the value of composition B was 6.0 Å (sphere-assumed radius= 7.7 Å) as shown in FIG. 5 and FIG. 6. FIG. 3 and FIG. 4 were subjected to inverse Fourier transformation, and the results of radius (sphere-assumed) distribution are shown in FIG. 7 and FIG. 8. The maximum values of the radii were respectively about 6 Å and 7 Å.

Figure 9:
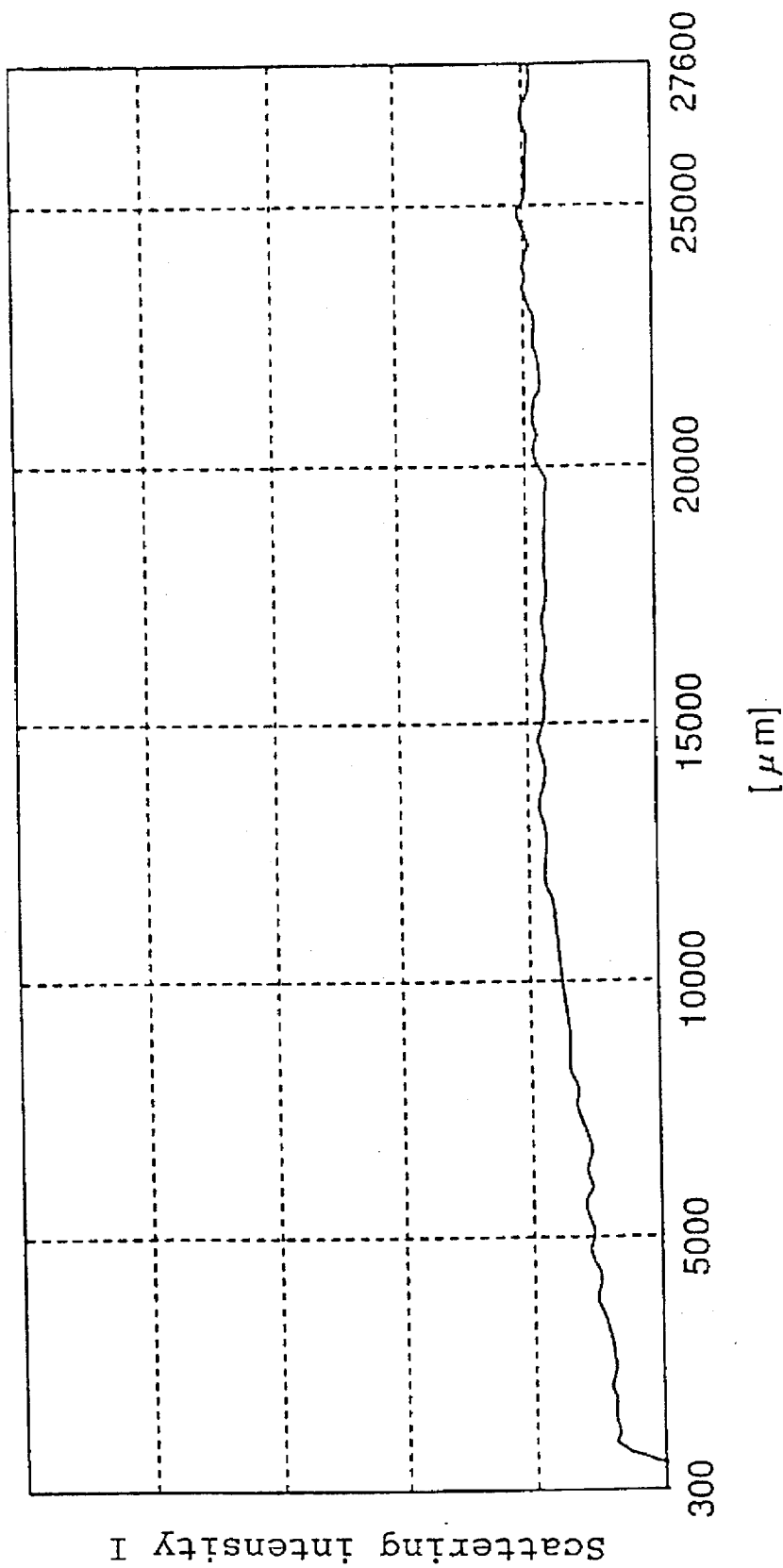
FIG. 9 shows measurement data of scattering intensity of a tetramethoxysilane oligomer obtained in Example 1 (synthesis of tetramethoxysilane oligomer).

The tetramethoxysilane oligomer obtained in the above (Synthesis of tetramethoxysilane oligomer) was subjected to analysis by small angle X-ray scattering under the same conditions as in the above (Identification of fine particles). FIG. 9 shows measurement data of scattering intensity, but as evident from this data, the structures of fine particles could not be recognized.

(Measurement of molecular weight)

The measurement of the molecular weight of the above composition A was conducted under the following conditions.

Degasifier: Shodex DEGAS (manufactured by Showa Denko K. K.)

Pump: Shimadzu LC6A (manufactured by Shimadzu Seisakusho K. K.)

Thermostat: manufactured by Nishio Kogyo K. K.

Column: Tosoh TSK-GEL for GPC G-4000H, G-2000H, G-1000H (manufactured by Toyo Soda K. K.)

Detector: Shodex RI SE-51 (refraction index detector manufactured by Showa Denko K. K.)

Data collector: Shimadzu C-R3A (manufactured by Shimadzu Seisakusho K. K.)

Data treatment: Personal computer (PC-9801 system)

Column temperature: 40° C.

Injection temperature: room temperature

Pump temperature: room temperature

Solvent: tetrahydrofuran, 1.0 ml/minute

Molecular weight calculation method: standard polystyrene conversion

Results are shown in the following Table:

| No. | (Peak) | (Molecular weight) | Number average M.W. (Mn) | Weight average M.W. (Mw) | Mw/Mn | Area (%) |
|---|---|---|---|---|---|---|
| 1 | 22.62 min. | 816 | 1327 | 1704 | 1.28 | −73.12 |
| 2 | 23.02 min. | 676 | 567 | 583 | 1.03 | −24.01 |
| 3 | 26.02 min. | 236 | 269 | 271 | 1.01 | −2.34 |
| 4 | 26.15 min. | 228 | 221 | 222 | 1.00 | −0.18 |
| 5 | 26.62 min. | 204 | 194 | 194 | 1.00 | −0.35 |
| 6 | 27.15 min. | 182 | 182 | 182 | 1.00 | −0.00 |
| 7 | 27.18 min. | 181 | 181 | 181 | 1.00 | 0.00 |
|   |   |   | 919 | 1393 | 1.52 |   |

A chlorine concentration of the composition A was measured to be at most 1.5 ppm.

Example 2

(Measurement of reactive functional group amount)

6.52 g of dechlorinated water, 0.31 g of aluminum (tris) acetylacetonate and 62.4 g of solvent "Solmix A-11" (ethanol 85.5%, IPA 1.1%, manufactured by Nihon Kaseihin K. K.) were added to 30.77 g of the tetramethoxysilane oligomer obtained in Example 1 (synthesis of tetramethoxysilane oligomer). The amount of water was 113% to an amount capable of theoretically completely hydrolysis-condensing the tetramethoxysilane oligomer. The above mixture was allowed to stand at room temperature for one day to obtain a colorless transparent homogeneous liquid-like aged material.

The aged material thus obtained was allowed to stand at 37° C. for 13 days under sealed condition, and thereafter the amount of reactive functional groups contained in a reactive ultrafine particulate silica in the aged material was determined by measuring methanol and ethanol in the solution by gas chromatography and measuring water in the solution by Karl Fischer's analysis. The analysis conditions were as follows:

Gas chromatography analysis condition:

Injection temperature: 180° C.
Column temperature: 180° C.
TCD (detector): 200° C.
Carrier gas: He 40 ml/minute
Current electric current: 100 mA
Filler: Porapaq type Q As this result, in the solution, the methanol amount was 18.9% (0.591 mol), the ethanol amount was 57.1% (1.211 mol) and the water amount was 1.15% (0.0639 mol), and consequently the consumed water amount was determined to be 0.3041 mol. Accordingly, the amounts of the respective reactive functional groups contained in the reactive ultrafine particulate silica in the aged material were determined to be 13.2 mol % of a methoxy group, 40.3 mol % of an ethoxy group and 46.0 mol % of a silanol group.
(Preparation of curable composition)

53.3 g of a hydroxy group-containing acrylic resin was added to 46.70 g of the above aged material, and the resultant mixture was allowed to stand for 12 hours. A non-volatile component in the solution was 21.3%, which corresponds to an $SiO_2$ concentration of 35% in film.
(Formation of coating film)

The curable composition thus obtained was coated on a mild steel substrate by a 250 μm applicator. The coated film was then heat-cured at 150° C. for 2 hours in an electric furnace. The coated film thus cured was transparent, and had a thickness of 11 μm and a pencil hardness of H.

Comparative Example 1
(Preparation of curable composition)

1.07 g of water, 0.28 g of maleic acid, 31.15 g of "Solmix A-11" and 53.2 g of a hydroxy group-containing acrylic resin were added to 14.3 g of tetramethoxysilane oligomer obtained in Example 1 (synthesis of tetramethoxysilane oligomer), and the resultant mixture was allowed to stand for 12 hours to obtain a curable composition. The amount of a non-volatile component in the solution was 21.3%, and an $SiO_2$ concentration in a film corresponds to 35%.
(Formation of coating film)

The curable composition thus obtained was coated on a mild steel substrate and was heat-cured in the same manner as in Example 2. The coating film thus obtained had a thickness of 7 to 8 μm and a pencil hardness of at most 5B, and was transparent. The surface of the coating film was sticky.

Example 3
(Preparation of curable composition)

56.12 g of a hydroxy group-containing polyester resin was added to 43.88 g of the aged material obtained in Example 2, and the resultant mixture was allowed to stand for 12 hours to obtain a curable composition. The amount of a non-volatile component in the solution was 35%, and an $SiO_2$ concentration in a film corresponds to 20%.
(Formation of coating film)

The curable composition thus obtained was coated on a mild steel substrate and was heat-cured in the same manner as in Example 2. The coating film thus obtained had a thickness of 35 μm and a pencil hardness of 5H, and was transparent.

Comparative Example 2
(Preparation of curable composition)

0.99 g of water, 0.81 g of aluminium acetylacetate, 26.60 g of methyl ethyl ketone, 4.42 g of isopropanol and 54.8 g of a hydroxy group-containing polyester resin were added to 13.17 g of the tetramethoxysilane oligomer obtained in Example 1 (synthesis of tetramethoxysilane oligomer), and the resultant mixture was allowed to stand for 12 hours to obtain a curable composition. The amount of a non-volatile component in the solution was 34.2%, and an $SiO_2$ concentration in a film corresponds to 20%.
(Formation of coating film)

The curable composition thus obtained was coated on a mild steel substrate and was heat-cured in the same manner as in Example 2, except that a 150 μm applicator was used. The coating film thus obtained had a thickness of 15 μm and a pencil hardness of F.

Example 4
(Preparation of curable composition)

35.06 g of a silyl group-containing acrylic resin was added to 64.94 g of the aged material obtained in Example 2, and the resultant mixture was allowed to stand for 1 week to obtain a curable composition. The amount of a non-volatile component in the solution was 29.7%, and an $SiO_2$ concentration in a film corresponds to 35%.
(Formation of coating film)

The curable composition thus obtained was coated on a mild steel substrate and was heat-cured in the same manner as in Example 2. The coating film thus obtained had a thickness of 27 μm and a pencil hardness of 4H, and was transparent.

Comparative Example 3
(Preparation of curable composition)

1.94 g of water, 0.51 g of aluminum acetylacetate, 25.71 g of isopropanol and 45.90 g of a silyl group-containing acrylic resin were added to 25.95 g of the tetramethoxysilane oligomer obtained in Example 1 (synthesis of tetramethoxysilane oligomer), and the resultant mixture was allowed to stand for 12 hours to obtain a curable composition. The amount of a non-volatile component in the solution was 38.7%, and an $SiO_2$ concentration in a film corresponds to 35%.
(Formation of coating film)

The curable composition thus obtained was coated on a mild steel substrate and was heat-cured in the same manner as in Example 2. The coating film thus obtained had a thickness of 45 μm and a pencil hardness was lowered to H.

Example 5
(Preparation of curable composition) 13.9 g of 1,4-butanediol and 39.5 g of "Solmix A-11" were added to 46.7 g of the aged material obtained in Example 2, and the resultant mixture was allowed to stand for 12 hours to obtain a curable composition. The amount of a non-volatile component in the solution was 21.3%, and an $SiO_2$ concentration in a film corresponds to 35%.
(Formation of coating film)

The curable composition thus obtained was coated on a mild steel substrate by a 150 μm applicator. Thereafter, it was heat-cured at 150° C. for 2 hours in an electric furnace. The coating film thus obtained had a thickness of 8 μm and a pencil hardness of 7H, and was transparent.

Comparative Example 4
(Preparation of curable composition)

1.08 g of water, 0.21 g of maleic acid, 13.8 g of 1,4-butanediol and 70.5 g of a "Solmix A-11" were added to 14.3 g of the tetramethoxysilane oligomer obtained in Example 1 (synthesis of tetramethoxysilane oligomer), and the resultant mixture was allowed to stand for 12 hours to obtain a curable composition. The amount of a non-volatile component in the solution was 21.3%, and an $SiO_2$ concentration in a film corresponds to 35%.

(Formation of coating film)

The curable composition thus obtained was coated on a mild steel substrate and was heat-cured in the same manner as in Example 2, except that a 150 µm applicator was used. The coating film thus obtained had a thickness of 8 µm and a pencil hardness was lowered to 5H.

Also, the coating film surface showed unevenness and was partly peeled.

Comparative Example 5

59.30 g of ethyl alcohol was blended with 29.15 g of the tetramethoxysilane oligomer obtained in Example 1 (synthesis of tetramethoxysilane oligomer), and 0.35 g of maleic acid curing catalyst and 6.16 g of dechlorinated water were then added thereto. The amount of the water added was 113% to the amount required for theoretically completely hydrolyzing the tetramethoxysilane oligomer. The resultant mixture was allowed to stand at room temperature for 2 days to obtain a curable composition.

An aluminum substrate (JIS 1100, thickness=0.1 mm) was dipped in a curable composition thus obtained, and was taken up at a rate of 3 mm/min. The substrate thus treated was then heat-cured at 150° C. for 1 hour in an electric furnace. The coating film thus obtained had a thickness of 0.4 µm, but was peeled from the substrate.

Comparative Example 6

A curable composition was prepared and a coating film was obtained in the same manner as in Example 1, except that the silane coupler was directly blended with the tetramethoxysilane oligomer.

The pencil hardness of the coating film thus obtained was lowered to 5H.

Example 6

51.24 g of ethanol was added to 29.15 g of the tetramethoxysilane oligomer obtained in Example 1 (synthesis of tetramethoxysilane oligomer), and 0.35 g of maleic acid and 7.61 g of dechlorinated water were then added thereto. The amount of the water added was 139% to the amount required for theoretically completely hydrolysis-condensing the tetramethoxysilane oligomer. The resultant mixture was aged by allowing to stand at room temperature for 3 days. Thereafter, 11.66 g of a silane coupler of the following structural formula ("KBM-503" manufactured by Shin-Etsu Kagaku K. K.) was added thereto, and the resultant mixture was allowed to stand for 2 hours to obtain a curable composition.

An aluminum substrate (JIS1100, thickness=0.1 mm) was dipped in the curable composition thus obtained, and was taken up at a rate of 10 mm/sec. Thereafter, the substrate thus treated was heat-cured at 150° C. for 1 hour in an electric furnace. The coating film thus obtained had a thickness of 2.6 µm and a pencil hardness of 9H, and any crack did not occur even by bending with a SUS304 bar having a diameter of 6 φmm at 180° C. A chemical resistance was examined by dropping a 5% sulfuric acid on the coating film and by visually observing after allowing the coating film to stand for 1 day, but there was no change.

Also, the curable composition did not cause any viscosity change even after being allowed to stand for 26 weeks.

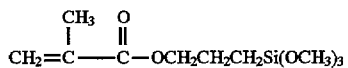

Example 7

55.34 g of ethanol was added to 23.57 g of the tetramethoxysilane oligomer obtained in Example 1, and 0.35 g of maleic acid and 6.61 g of dechlorinated water were added thereto. The amount of the water added was 150% to the amount required for theoretically completely hydrolysis-condensing the tetramethoxysilane oligomer. The resultant mixture was aged by allowing to stand at room temperature for 2 days. Thereafter, 14.14 g of a silane coupler of the following structural formula ("KBM-1003" manufactured by Shin-Etsu Kagaku K. K. was added thereto, and the resultant mixture was allowed to stand for 2 hours to obtain a curable composition.

An aluminum substrate (JIS1100, thickness=0.1 mm) was dipped in the curable composition thus obtained, and was taken up at a rate of 20 mm/min. The substrate thus treated was heat-cured at 150° C. for 1 hour in an electric furnace. The coating film thus obtained had a thickness of 2.1 µm and a pencil hardness of 9H, and any crack did not occur even by bending with a SUS304 bar having a diameter of 6 φmm at 180° C. A chemical resistance was examined by dropping a 5% sulfuric acid on the coating film and by visually observing after allowing the coating film to stand for 1 day, but there was no change.

Also, the curable composition did not cause any viscosity change even after allowing to stand for 40 weeks.

Example 8

20 Parts by weight of 0.32 wt % maleic acid aqueous solution (pH 1.8) was added to 100 parts by weight of the tetramethoxysilane oligomer obtained in Example 1 (synthesis of tetramethoxysilane oligomer), and the resultant mixture was stirred at room temperature for 30 minutes to obtain a uniform transparent liquid-like material. Thereafter, 60 parts by weight of an epoxy type silane coupler ("A-187" manufactured by Nihon Uniker K. K.) was added thereto, and the resultant mixture was stirred at room temperature for 30 minutes. Thereafter, 180 parts by weight of dechlorinated water was added thereto, and the resultant mixture was stirred at room temperature for 30 minutes. The curable composition thus obtained had a pH of 3.0.

An aluminum substrate (JIS1100, thickness=0.1 mm) was dipped in the curable composition thus obtained, and was taken up at a rate of 5 mm/sec. The substrate thus coated was allowed to stand at room temperature for 5 minutes, and was then heat-cured at 150° C. for 1 hour in an electric furnace. The coating film thus obtained had a thickness of 3.2 µm and a pencil hardness of 9H, and any crack did not occur even by bending with a SUS306 bar having a diameter of 6 φmm at 180° C. A chemical resistance was examined by dropping a 5% sulfuric acid thereon and visually observing the coating film surface after being allowed to stand for 1 day, but there was no change.

Example 9

Seven days after the preparation of the curable composition, the curable composition obtained in Example 3 was coated on a glass-containing epoxy resin substrate by a 500 µm applicator, and was heat-cured at 150° C. for 1 hour in an electric furnace. The transparent coating film thus obtained had a bonding strength of 12 kg/cm². The same procedure as mentioned above was repeated by using a ceramic-made substrate in place of the glass-containing epoxy substrate, and the coating film thus obtained had a bonding strength of 50 kg/cm² and was excellent in adhesion.

Example 10

A curable composition was prepared and a coating film was obtained in the same manner as in Example 8, except that 60 parts by weight of a vinyl type silane coupler ("KBM-1003, manufactured by Shin-Etsu Kagaku K. K.) was used in place of the epoxy type coupler. The coating film thus obtained had a thickness of 1.9 µm and a pencil hardness of 9H, and any crack did not occur even by bending with an SUS bar having a diameter of 6 φmm at 180° C. The chemical resistance was examined by dropping a 5% sulfuric acid thereon and by visually observing the coating film surface after being allowed to stand for 1 day, but there was no change.

Example 11

(Preparation of curable composition)

6.52 g of dechlorinated water, 62.5 g of "Solmix A-11" and 0.08 g of 35% hydrochloric acid were added to 30.77 g of the tetramethoxysilane oligomer obtained in Example 1 (synthesis of tetramethoxysilane oligomer). The amount of the water added was 113% to the amount required for theoretically completely hydrolyzing the tetramethoxysilane oligomer. The resultant mixture was aged by allowing to stand at room temperature for 1 day to prepare an aged material. A curable composition was obtained in the same manner as in Example 2, except that the above obtained aged material was used.

(Formation of coating film)

The curable composition thus obtained was coated on a mild steel substrate by a 250 µm applicator. Thereafter, the coated film was heat-cured at 150° C. for 2 hours in an electric furnace. The coating film thus obtained was transparent and had a thickness of 11 µm and a pencil hardness of H.

Example 12

A curable composition was prepared in the same manner as in Example 3, except that the aged material obtained in Example 11 was used.

(Formation of coating film)

A coating film was obtained in the same manner as in Example 3, except that the above obtained curable composition was used. The coating film thus obtained was transparent and had a thickness of 36 µm and a pencil hardness of 5H.

Example 13

A curable composition was prepared in the same manner as in Example 4, except that the aged material obtained in Example 11 was used.

(Formation of coating film)

A coating film was formed in the same manner as in Example 4 by using the above prepared curable composition. The coating film thus obtained was transparent and had a thickness of 26 µm and a pencil hardness of 4H.

Example 14

A curable composition was obtained in the same manner as in Example 5, except that the aged material obtained in Example 11 was used.

(Formation of coating film)

A coating film was formed in the same manner as in Example 5 by using the above prepared curable composition. The coating film thus obtained was transparent and had a thickness of 8 µm and a pencil hardness of 7H.

Examples 15 to 18

The same procedures as in Examples 11 to 14 were repeated, except that the same amount of nitric acid was used in place of 0.08 g of hydrochloric acid. Various physical properties of the coating films thus obtained are shown in the following Table 1.

Example 19

60 Parts by weight of a 1 wt % maleic acid aqueous solution (pH 1.5) was added to 100 parts by weight of the tetramethoxysilane oligomer obtained in Example 1 (synthesis of tetramethoxysilane oligomer), and the resultant mixture was stirred at room temperature for 5 minutes to obtain a uniform transparent liquid-like material. Thereafter, 20000 parts by weight of dechlorinated water was added thereto. Further, 30 parts by weight of an epoxy type silane coupler (Product No. "A-187" manufactured by Nihon Uniker K. K.) was added thereto, and the resultant mixture was stirred at room temperature for 1 hour to obtain a curable composition. The curable composition thus obtained had a pH value of 3.7.

1000 g of aluminum hydroxide powder (Product No. "OC-2000" manufactured by Alcor Kasei K. K., average particle size=47 µm) was added to 2500 parts by weight of the above prepared curable composition, and the resultant mixture was stirred for 20 minutes at 1500 rpm in a Henschel mixer. Thereafter, water vapor of 110° C. was passed through the jacket of the Henschel mixer to heat the inside of the Henschel mixer to at least 100° C., and the inside was heated for 30 minutes while stirring, thereby obtaining coated aluminum hydroxide powder.

Example 20

60 Parts by weight of a 1 wt % maleic acid aqueous solution (pH 1.5) was added to 100 parts by weight of the tetramethoxysilane oligomer obtained in Example 1 (synthesis of tetramethoxysilane oligomer), and the resultant mixture was stirred at room temperature for 5 minutes to obtain a uniform transparent liquid-like material. Thereafter, 43 parts by weight of a vinyl type silane coupler ("KBM-1003" manufactured by Shin-Etsu Kagaku K. K.) was added thereto, and the resultant mixture was stirred at room temperature for 1 hour. Further, 14000 parts by weight of dechlorinated water was added thereto. The curable composition thus obtained had a pH value of 3.3.

1000 g of aluminum hydroxide powder (Product No. "C-385" manufactured by Alcor Kasei K. K., average particle size=8 µm) was added to 2500 parts by weight of the above prepared curable composition, and the resultant mixture was stirred for 20 minutes at 1500 rpm in a Henschel mixer. Thereafter, water vapor of 110° C. was passed through the jacket of the Henschel mixer to heat the inside of the Henschel mixer to at least 100° C., and the inside was heated for 30 minutes while stirring, thereby obtaining coated aluminum hydroxide powder.

Example 21

Dechlorinated water and maleic acid were added to 100 parts by weight of the tetramethoxysilane oligomer obtained in Example 1 so as to have a pH value of 1.0. The resultant mixture was stirred at room temperature for 2 minutes to obtain a transparent concentrated material. Thereafter, 1100 parts by weight dechlorinated water was added thereto. Further, 50 parts by weight of a methyl acrylate type silane coupler (Product No. "A-174" manufactured by Nihon Uniker K. K.) was added thereto as an organic compound, and the resultant mixture was stirred at room temperature for 5 hours to obtain a liquid-like material. The liquid-like material thus obtained had a pH value of 2.0.

1000 g of aluminum hydroxide powder (Product No. "C-385" manufactured by Alcor Kasei K. K., average particle size=8 μm) was added to 2500 parts by weight of the above prepared liquid-like material, and the resultant mixture was stirred for 20 minutes at 1500 rpm in a Henschel mixer. Thereafter, water vapor of 110° C. was passed through the jacket of the Henschel mixer to heat the inside of the Henschel mixer to at least 100° C., and the inside was heated for 30 minutes while stirring, thereby obtaining coated aluminum hydroxide powder.

Example 22
(Preparation of curable composition)

25 Parts by weight of a 0.3% maleic acid aqueous solution (pH 1.92) was added to 100 parts by weight of the tetramethoxysilane oligomer obtained in Example 1, and the resultant mixture was stirred at room temperature for 30 minutes to obtain a transparent liquid-like hydrolyzate of the tetramethoxysilane oligomer.

Further, the hydrolyzate thus obtained was diluted with 1500 parts by weight of dechlorinated water to obtain a transparent curable composition having a pH value of 3.4.

Thereafter, after charging 500 parts by weight of calcium carbonate powder (guaranteed reagent: average particle size of precipitated product=9.9 μm, specific surface area=0.28 m²/g, manufactured by Ishizu Seiyaku K. K.) into a Henschel mixer, water vapor of 110° C. was passed through the jacket of the Henschel mixer to heat the inside of the Henschel mixer to at least 100° C., and the resultant mixture was heated for 15 minutes while stirring, thereby obtaining coated calcium carbonate powder.

The coated calcium carbonate powder thus obtained did not cause agglomeration, and an angle of repose of the coated calcium carbonate powder measured by "ABD system powder property-measuring device" was 44°. Also, this powder had an open-packed density of 0.65 g/cc, and was placed in water and was stirred by hand to check a wetting property to water. As this result, the total amount of the calcium carbonate powder was wetted with water and was settled.

On the other hand, starting calcium carbonate powder before coating had an angle of repose of 59° and a open-packed density of 0.39 g/cc, and with regard to its wetting property, the total amount of powder was rapidly wetted and settled.

Example 23
(Preparation of curable composition)

After diluting 100 parts by weight of the hydrolyzate of the tetramethoxysilane obtained in Example 1 with 1130 parts by weight of dechlorinated water, 65 parts by weight of a vinyl type silane coupler ("A-171" manufactured by Nihon Uniker K. K.) was added thereto, and the resultant mixture was stirred at room temperature for about 10 minutes to obtain a transparent curable composition (coating agent).
(Coating treatment of calcium carbonate powder)

After charging 500 parts by weight of calcium carbonate powder (guaranteed reagent: average particle size of precipitated product=9.9 μm, specific surface area=0.28 m²/g, manufactured by Ishizu Seiyaku K. K.) into a Henschel mixer, 50 parts by weight of the above prepared coating agent (preparation of coating agent) was added thereto at room temperature, and the resultant mixture was heated for 15 minutes while stirring to obtain coated calcium carbonate powder.

The calcium carbonate powder thus obtained did not cause agglomeration, and an angle of repose of the powder measured by "ABD system powder property-measuring device" was 44°. Also, this powder had an open-packed density of 0.49 g/cc, and was placed in water and stirred by hand to check its wetting property to water. As this result, the total amount of the powder was rapidly wetted and settled.

Example 24
(Preparation of curable composition)

200 Parts by weight of ethyl alcohol solvent was added to 100 parts by weight of the tetramethoxysilane oligomer obtained in Example 1. Thereafter, 1.3 parts by weight of maleic acid and 22 parts by weight of dechlorinated water were added thereto, and the resultant mixture was stirred at room temperature for 30 minutes and was aged for 3 days. Thereafter, 30 parts by weight of an epoxy type silane coupler ("KBM403" manufactured by Shin-Etsu Kagaku K. K.) was added thereto, and the resultant mixture was stirred at room temperature for 1 hour.

To 35 parts by weight of the liquid-like material thus obtained, was added 1000 parts by weight of aluminum hydroxide powder (Product No. OC-2000, average particle size 47 μm, manufactured by Alcor Kasei K. K.), and the resultant mixture was stirred at room temperature for 15 minutes at 500 rpm in a Henschel mixer. Thereafter, the resultant mixture was heated under stirring for 20 minutes by heating the jacket of the Henschel mixer with water vapor of 110° C. to obtain coated aluminum hydroxide powder.

Example 25

200 Parts by weight of acetone solvent was added to 100 parts by weight of the tetramethoxysilane oligomer obtained in Example 1. Thereafter, 1.3 parts by weight of maleic acid and 22 parts by weight of dechlorinated water were added thereto, and the resultant mixture was stirred at room temperature for 30 minutes and was aged for 3 days. Thereafter, 40 parts by weight of methyl acrylate type silane coupler ("KBM503" manufactured by Shin-Etsu Kagaku K. K.) was added thereto, and the resultant mixture was stirred at room temperature for 1 hour.

To 40 parts by weight of the liquid-like material, was added 1000 parts by weight of aluminium hydroxide powder (Product No. C-385, average particle size 8 μm, manufactured by Alcor Kasei K. K.), and the resultant mixture was stirred at room temperature for 15 minutes at 500 rpm in a Henschel mixer. Thereafter, the resultant mixture was heated for 20 minutes by heating the jacket of the Henschel mixer with water vapor of 110° C. to obtain coated aluminium hydroxide powder.

Example 26 and 27

48.40 g of A-11 (industrial ethanol manufactured by Nihon Kasei K. K.) was added to 40.50 g of tetramethoxysilane, and 0.31 g of maleic acid and 10.80 g of dechlorinated water were added thereto. The amount of the water was 113% to the amount required for theoretically completely hydrolyzing the tetramethoxysilane. The resultant mixture was aged by allowing to stand at room temperature for 3 days to obtain an aged material.
(Coating treatment of calcium carbonate powder)

500 Parts by weight of calcium carbonate powder (guaranteed reagent: average particle size of settled product=9.9 μm, specific surface area=0.28 m²/g, manufactured by Ishizu Seiyaku K. K.) was charged into a Henschel mixer, and a mixture of 10 parts by weight of the above prepared aged material and 40 parts by weight of acetone was then added thereto at room temperature, and the resultant mixture was stirred at room temperature for 15 minutes at 1500 rpm. Thereafter, the inside of the Henschel mixer was heated at at least 100° C. by passing water vapor of 110° C. through the jacket of the Henschel mixer, and the heating was continued for 15 minutes under stirring to obtain coated calcium carbonate powder.

The coated calcium carbonate powder thus obtained did not agglomerate, and had an angle of repose of 45° as measured by "ABD system powder property-measuring device". Also, it had an open-packed density of 0.63 g/cc, and when it was placed in water and stirred by hand to check a wetting property to water, about a half amount of the calcium carbonate powder was not wetted with water and was floated.

Example 28

To 100 parts by weight of the aged material obtained in Example 24, was added 25 parts by weight of a vinyl type silane coupler ("KBM-1003" manufactured by Shin-Etsu Kagaku K. K.), and 5 parts by weight of water was then added thereto. The resultant mixture was fully mixed, and was allowed to stand at room temperature for 2 hours to obtain a coating solution.

Thereafter, 500 parts by weight of calcium carbonate powder (guaranteed reagent: precipitated product average particle size=9.9 μm, specific surface area=0.28 m²/g, manufactured by Ishizu Seiyaku K. K.) was charged into a Henschel mixer, and a mixture of 13 parts by weight of the above aged material and 37 parts by weight of acetone was added thereto at room temperature, and the resultant mixture was stirred at room temperature for 15 minutes at 1500 rpm. Thereafter, the inside of the Henschel mixer was heated at at least 100° C. by passing water vapor of 110° C. into the jacket of the Henschel mixer and the heating was continued for 15 minutes under stirring to obtain coated calcium carbonate powder.

The calcium carbonate powder thus obtained did not agglomerate, and an angle of repose measured by "ABD system powder property-measuring device" was 44°. Also, an open-packed density was 0.61 g/cc, and the resultant product was placed in water and stirred with hand to check a wetting property to water. As this result, about a half amount of the calcium carbonate powder was floated without being wetted with water.

Example 29
(Preparation of curable composition)

To 12.5 g of the aged material obtained in Example 2, was added 7.46 g of Hitalloid D-1002 (manufactured by Hitachi Kasei Polymer K. K.), 5.0 g of KBM-503 (manufactured by Shin-Etsu Kagaku K. K.) and 0.6 g of water were added, and the resultant mixture was stirred to obtain a curable composition.
(Powder treatment)

1000 g of calcium carbonate powder (Product No. "Escalene #200" manufactured by Tsuchiya Kaolin K. K.) was charged into a Henschel mixer, together with 25.1 g of the above curable composition, and the resultant mixture was heat-treated at 110° C. for 60 minutes under stirring to effect coating.
(Preparation of bulk molding compounds)

The above treated calcium carbonate powder was used as a filler for carrying out molding in accordance with the following method.
i) Materials used:
Resin: Unsaturated polyester resin
Filler: The above prepared powder
Lubricant: Zinc stearate
Catalyst: t-Butyl benzoate
Reinforcing agent: Glass fiber
i) Kneading device:
Batch type 11 kneader (manufactured by Irie Shokai K. K.)
ii) Kneading procedure and conditions
① Dry blending of powder (filler+lubricant) 5 minutes
② Unsaturated polyester resin (Polymal 6409 manufactured by Takeda Yakuhin K. K.) and catalyst were added thereto, and the resultant mixture was kneaded for 6 to 7 minutes to obtain a paste-like material.
③ Glass fiber was added to the above obtained paste-like material, and the resultant mixture was kneaded for 7 minutes, and the resultant kneaded material was molded under the following conditions to obtain a bulk molding compound.
iii) Molding conditions
① Molding device: 26 t press
② Mold temperature: 140° C.
③ Molding time: 10 minutes
iv) Molded product size: 3×100×100 m/m
(Properties of molded products)

A molded product thus obtained was evaluated in accordance with the following evaluation method. The results are shown in the following Table 2.

| Evaluation items | Test method | Test conditions |
| --- | --- | --- |
| ① Bending strength & modulus of elasticity | JIS K7055 (A method) | Distance between fulcrums: 50–52 mm<br>Test speed: 1.5 mm/min<br>Test temperature: room temp. |
| ② Izod impact strength | JIS K7110 | Test piece: No. 2A test piece (with notch)<br>Rising angle of hammer: 150° C.<br>Impact direction: edge-wise<br>Test temperature: room temp. |

Example 30

The same procedure as in Example 29 was repeated, except that aluminum hydroxide powder was used in place of calcium carbonate powder. The results are shown in the following Table 2.

Examples 31 and 32

The same procedure as in Example 2 was repeated, except that the amounts of water were varied, and physical properties of the coating films thus obtained are shown in the following Table 3.

Example 33

A craft paper was dipped in the curable composition obtained in Example 1, and was then dried at 80° C. The paper was then maintained at 300° C. for 30 minutes, but no change in external appearance was recognized. The wet tensile strength in the longitudinal direction of the paper was 12.7 kgf, and was largely improved in comparison with 1.08 kgf of untreated craft paper.

Example 34

60 Parts by weight of the coated aluminum hydroxide powder obtained in Example 21 was mixed with 40 parts by weight of unsaturated polyester resin, and the resultant mixture was cast-molded to obtain an artificial marble.

Example 35

The same procedure as in Example 1 was repeated, except for using an aged material obtained by blending 10.83 g of water and 40.51 g of tetramethoxysilane obtained by reaction of metallic silicon and methanol, and aging the resultant blend by allowing to stand for 1 day. The coating film thus obtained had the same physical properties as those obtained in Example 1.

Examples 36 to 39

The aged material obtained in Example 2, silane couplers and water were blended as shown in the following Table 4, and the resultant blends were aged at room temperature for 3 hours and were coated. The coating conditions are shown in the following Table 4. The coating films thus obtained had physical properties as shown in the following Table 4.

Evaluation method of stain resistance property

Stain resistance tests were carried out by using curry ("Bon Curry Gold" manufactured Otsuka Shokuhin K. K.) and lipstick ("Reschente Lipstick NRD447" manufactured by Shiseido K. K.) as staining materials in accordance with JIS K5400 (1990) 8.10, and their external appearances were visually compared with the original test piece.

With regard to carbon staining material indicated by client, a stain resistance test was carried out and evaluated in accordance with "Japan Housing Corporation special common specification" (glossy synthetic resin emulsion paint), as illustrated below.

1 g of a staining material comprising 10% of carbon black (JIS K5107) incorporated in white vaseline of the Japanese Pharmacopoeia was placed on a cloth, and was rubbed into a test piece with a uniform force, and the test piece was allowed to stand for 30 minutes.

Thereafter, the staining material was wiped off by a cloth, and the test piece was then washed with a cloth bathed in a 5% toilet soap aqueous solution by repeatedly rubbing 20 times, and was washed with water, and was dried in a constant temperature dryer (50°±2° C.) for 30 minutes.

Diffused reflective rate of sample before staining and diffused reflective rate of stained sample after washing were measured in accordance with JIS K5400 (1990) 7.5 with regard to three points of each test sample, and stain recovery rate was determined in accordance with the following calculation formula.

The results are expressed by their average values.

$$\text{Stain recovery rate} = \frac{\text{Diffused reflective rate of stained sample after washing } (Y_1)}{\text{Diffused reflective rate of sample before staining } (Y_0)} \times 100$$

TABLE 1

|  | Example 15 | Example 16 | Example 17 | Example 18 |
|---|---|---|---|---|
| Film thickness | 11μ | 36μ | 25 μm | 8 μm |
| Pencil hardness | H | 5H | 4H | 7H |
| External appearance | Transparent | Transparent | Transparent | Transparent |

TABLE 2

| | | Comparative Example | | Example | | Comparative Example | | Example | |
|---|---|---|---|---|---|---|---|---|---|
| Filler | Kind | CaCO$_3$ | | CaCO$_3$ | | Al(OH)$_3$ | | Al(OH)$_3$ | |
| | Surface treatment | Untreated | | Aged material +D-1002 +KBM-503 | | Untreated | | Aged material +D-1002 +KBM-503 | |
| *–1 (measured value) Bending strength (kgf/mm$^2$) | | 10.07, | 15.58 | 13.67, | 14.68 | 8.94, | 14.37 | 8.95, | 11.44 |
| | | 11.86, | 13.48 | 13.24, | 9.05 | 7.86, | 12.72 | 13.81, | 11.25 |
| | | 11.73, | 6.44 | 12.97, | 13.01 | 9.34, | 10.75 | 13.61, | 13.31 |
| | | 14.00, | 14.23 | 16.11, | 18.87 | 9.05, | 6.40 | 13.26, | 13.06 |
| (average value) | | 12.2 | | 14.0 | | 9.9 | | 12.3 | |
| *–1 (measured value) Bending modulus of elasticity (kgf/mm$^2$) | | 1116, | 1216 | 1365, | 1352 | 1250, | 1349 | 1259, | 1305 |
| | | 1113, | 1191 | 1163, | 1193 | 1260, | 1426 | 1389, | 1223 |
| | | 1259, | 1057 | 1157, | 1148 | 1257, | 1280 | 1416, | 1385 |
| | | 1232, | 1156 | 1160, | 1389 | 1279, | 1247 | 1269, | 1325 |
| (average value) | | 1.17 × 10$^3$ | | 1.24 × 10$^3$ | | 1.29 × 10$^3$ | | 1.32 × 10$^3$ | |
| *–1 (measured value) Izod impact strength (kgf cm/cm$^2$) | | 36.1, | 37.1 | 47.2, | 51.3 | 39.6, | 49.5 | 46.3, | 35.0 |
| | | 47.8, | 50.2 | 45.5, | 53.3 | 38.8, | 38.6 | 48.2, | 45.7 |
| | | 47.5, | 48.6 | 53.2, | 39.8 | 41.3, | 37.2 | 47.1, | 38.6 |
| | | 45.4, | 46.2 | 54.1, | 50.4 | 40.3, | 42.5 | 49.9, | 52.2 |
| | | 40.6 | | 42.6 | | 41.5, | 38.9 | 58.0, | 43.5 |
| | | | | | | 29.0, | 31.4 | 46.9, | 52.9 |
| (average value) | | 44.4 | | 47.0 | | 39.0 | | 47.0 | |

TABLE 3

| | Comparative Example | | | | Example 2 | Example 31 | Example 32 |
|---|---|---|---|---|---|---|---|
| Hydrolysis rate (%) | 0 | 40 | 60 | 80 | 100 | 113 | 200 |
| Charged composition | | | | | | | |
| Aged material | | | | | | | |
| Oligomer | 30.8 | 30.8 | 30.8 | 30.8 | 30.8 | 30.8 | 30.8 |
| A-11 | 68.9 | 66.6 | 65.5 | 64.3 | 63.2 | 62.4 | 57.4 |
| Al acac | 0.31 | 0.31 | 0.31 | 0.31 | 0.31 | 0.31 | 0.31 |
| Water | 0 | 2.30 | 3.45 | 4.60 | 5.75 | 6.50 | 11.5 |
| Total | 100 | 100 | 100 | 100 | 100 | 100 | 100 |
| Resin | 53.5 | 53.5 | 53.5 | 53.5 | 53.5 | 53.5 | 53.5 |
| Aging (aged material/organic component) | 1 day/ 4 days | 1 day/ 4 days | 1 day/ 4 days | 1 day/ 4 days | 1 day/ 4 days | 1 day/ 4 days | 1 day/ 4 days |
| Coating | Coating by 150 μm applicator | | | | | | |
| Curing condition | 150° C. × 2 hr | | | | | | |
| Evaluation of coating film | | | | | | | |
| External appearance | CT | CT | CT | CT | Microscopic whitening | Slight whitening | Whitening |
| (ΔH) | 0.1 | 0.1–0.3 | 0.1–0.2 | 0.4–0.5 | 3.5–6.1 | 14–20 | 5–6 |
| Film thickness (μm) | 16 | 19 | 24 | 25 | 20 | 23 | 21 |
| Pencil hardness | 5–6B | 3–4B | B | HB | H | H | H |
| XL Rubbing | XX Eluation | XX Eluation | X Defect | X Defect | ○ | ○ | ○ |
| Resistance to boiling water | ○ | ○ | ○ | ○ | ○ | ○ | ○ |
| Acid resistance (5% sulfuric acid) | ○ | ○ | ○ | ○ | ○ | ○ | ○ |

CT: Colorless transparent XL Rubbing ... X: Uncountable defects
○: Substantially no defects

TABLE 4

| Silane coupler | KBM-403*[1] | KBM-503*[1] | KBM-1003*[1] | KBM-803*[1] | A-163*[2] |
|---|---|---|---|---|---|
| Charged amount | | | | | |
| Aged material | 30 | 30 | 30 | 30 | 30 |
| Silane coupler | 6 | 6 | 6 | 6 | 6 |
| Water | 0.77 | 0.74 | 1.24 | 0.82 | 1.34 |
| Time for allowing to stand after mixing silane coupler | Room temp. 3 hr. | Room temp. 3 hr. | Room temp. 3 hr. | Room temp. 3 hr. | Room temp. 3 hr. |
| Coating | | | | | |
| Coating method | Dipping method: 3 mm/sec | | | | |
| Curing condition | 150° C. × 1 hour drying | | | | |
| Evaluation of film | | | | | |
| External appearance | Transparent | Transparent | Transparent | Transparent | Transparent |
| Turbidity (haze) | 0.0 | 0.0 | 0.0 | 0.0 | 0.0 |
| Film thickness (μm) | 2.2 | 1.2 | 0.8 | 1.2 | 0.5 |
| Pencil hardness | 9H | 9H | 9H | 5H | 6H |
| Adhesion (glass) | 100/100 | 100/100 | 100/100 | 100/100 | 100/100 |
| (aluminium) | 0/100 | 100/100 | 100/100 | 100/100 | 100/100 |
| Xylene rubbing | ○ | ○ | ○ | ○ | ○ |
| Bending property | | | | | |
| 10 mmφ × 180° | x Exfoliation | ○ | ○ | ○ | ○ |
| 6 mmφ × 180° | | ○ | ○ | ○ | x Exfoliation |
| 3 mmφ × 180° | | ○ | x Exfoliation | x Exfoliation | |
| All aluminum plates | | | | | |
| Resistance to boiling water b.p. × 3 hour glass plate | Δ Partial Exfoliation | Δ Partial Exfoliation | ○ | ○ | ○ |
| Acid resistance (5% sulfuric acid spot × 15 hr) | ○ | ○ | ○ | ○ | ○ |
| Heat-resistance | | | | | |
| SUS 500° C. × 1 hr | ○ | ○ | ○ | ○ | ○ |
| SUS 100° C. × 1 hr | ○ | ○ | ○ | x scale-like | ○ |
| Water contact angle (°) | 60 | 60 | 50 | 45 | 72 |

TABLE 4-continued

| Stain resistance | | | | | |
|---|---|---|---|---|---|
| Curry | 100% | 100% | 100% | 100% | 100% |
| Carbon | 100% | 100% | 100% | 100% | |
| Lipstick | 100% | 100% | 100% | 100% | |

*[1] manufactured by Shin-Etsu Kagaku K.K.
*[2] manufactured by Nihon Uniker

INDUSTRIAL APPLICABILITY

The present invention provides a thick coating film applicable to various substrate materials such as substrates, powder, particles and wire-like materials, which has satisfactory properties excellent in stain resistance, heat resistance, scratch resistance and weather resistance, and also has a high hardness and an excellent bending processability causing no crack. Further, since it is possible to coat various powder surfaces with a glassy film and to use various silane couplers in combination therewith, the present invention achieves an effect of improving adhesion between a filler and various matrices such as FRP and artificial marble.

We claim:

1. A curable composition comprising:
   an aged mixture of tetramethoxysilane and water, said water being present in an amount in excess of the theoretical amount sufficient for the hydrolysis and condensation of 100% of the silane; and
   a reactive organic compound having at least two functional groups capable of condensing with the product of hydrolysis and condensation of the silane in the aged mixture.

2. A method for preparing a curable composition, comprising:
   adding water to tetramethoxysilane in an amount in excess of the theoretical amount sufficient for the hydrolysis and condensation of 100% of the silane;
   aging the resultant mixture; and
   blending a reactive organic compound having at least two functional groups capable of condensing with the product of hydrolysis and condensation of the silane in the aged mixture.

3. The method for preparing a curable composition according to claim 2, wherein the aging is carried out at a pH of from 1 to 3.

4. The method for preparing a curable composition according to claim 2, wherein a solvent other than water is present at the time of aging.

5. A curable composition obtained by blending a solution containing fine particles of hydrolysis-condensate of tetramethoxysilane having a radius of gyration of at most 10 Å with a reactive organic compound having at least two functional groups capable of condensing with condensation-reactive functional groups contained in said fine particles.

6. A curable composition obtained by blending a solution containing fine particles of hydrolysis-condensate of tetramethoxysilane having a radius of gyration of at most 10 Å with a reactive organic compound having at least two functional groups capable of condensing with condensation-reactive functional groups contained in said fine particles, and further allowing the resultant mixture to stand.

7. The curable composition according to claim 1, wherein said aged mixture contains an oligomer, wherein a monomeric tetramethoxysilane content of said aged mixture is at most 1% by weight.

8. The curable composition according to claim 1, wherein said reactive organic compound is a silane coupler.

9. The curable composition according to claim 8, wherein said silane coupler is at least one member selected from the group consisting of the following components having the following structural formulas:

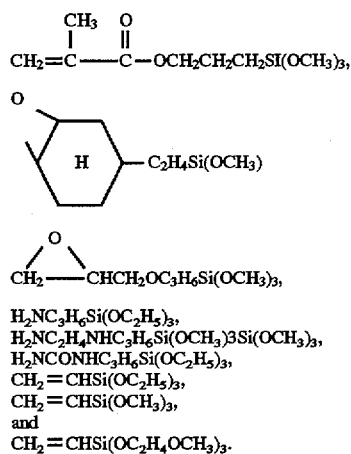

$H_2NC_3H_6Si(OC_2H_5)_3$,
$H_2NC_2H_4NHC_3H_6Si(OCH_3)_3 3Si(OCH_3)_3$,
$H_2NCONHC_3H_6Si(OC_2H_5)_3$,
$CH_2=CHSi(OC_2H_5)_3$,
$CH_2=CHSi(OCH_3)_3$,
and
$CH_2=CHSi(OC_2H_4OCH_3)_3$.

10. The curable composition according to claim 1, further comprising a monohydric $C_1$–$C_3$ alcohol as a solvent.

11. The curable composition according to claim 1, further comprising a curing catalyst selected from the group consisting of acetic acid, maleic acid, oxalic acid and fumaric acid.

12. An inorganic powder coated with the curable composition according to claim 1.

13. The inorganic powder according to claim 12, wherein the coated inorganic powder is aluminum hydroxide or calcium carbonate.

14. A fiber reinforced plastic obtained by mixing the inorganic powder according to claim 12 with a resin component and a reinforcing fiber, and compression-molding the mixture.

15. A coating film obtained by coating the curable composition of claim 1 onto a substrate and drying at below 100° C.

16. A transparent coating film having a thickness of at least 30 μm, which contains $SiO_2$ at a concentration of least 10 wt % and is not cracked by bending with a 10 mmφ bar at 180°.

17. A transparent coating film having a thickness of at least 30 μm, which contains $SiO_2$ at a concentration of at least 10 wt % and is not cracked by bending with a 6 mmφ bar at 180°.

18. A transparent coating film having a thickness of at least 30 μm, which contains $SiO_2$ at a concentration of at least 10 wt % and is not cracked by bending with a 3 mmφ bar at 180°.

* * * * *

UNITED STATES PATENT AND TRADEMARK OFFICE
CERTIFICATE OF CORRECTION

PATENT NO. : 5,733,644
DATED : March 31, 1998
INVENTOR(S) : Seiichiro TANAKA, et al.

It is certified that error appears in the above-identified patent and that said Letters Patent is hereby corrected as shown below:

On the title page, item [22] should be:

--[22] PCT Filed: Apr. 17, 1995--

Signed and Sealed this

Twenty-third Day of June, 1998

*Attest:*

BRUCE LEHMAN

*Attesting Officer*     *Commissioner of Patents and Trademarks*